US012783361B2

(12) United States Patent
Susairaj et al.

(10) Patent No.: US 12,783,361 B2
(45) Date of Patent: Nov. 3, 2026

(54) DATABASE RAPID RESTORE AFTER MEDIA FAILURE

(71) Applicant: Oracle International Corporation, Redwood Shores, CA (US)

(72) Inventors: Margaret Susairaj, Sugar Land, TX (US); Steven Wertheimer, Kentfield, CA (US); Sibsankar Haldar, Cupertino, CA (US); Sumanta Chatterjee, Menlo Park, CA (US); Jose Antonio Lasa Gutierrez, Zapopan (MX)

(73) Assignee: Oracle International Corporation, Redwood Shores (CA)

( * ) Notice: Subject to any disclaimer, the term of this patent is extended or adjusted under 35 U.S.C. 154(b) by 237 days.

(21) Appl. No.: 17/380,015

(22) Filed: Jul. 20, 2021

(65) Prior Publication Data

US 2023/0021672 A1 Jan. 26, 2023

(51) Int. Cl.

| | |
|---|---|
| ***G06F 11/1446*** | (2026.01) |
| ***G06F 11/07*** | (2006.01) |
| ***G06F 11/14*** | (2026.01) |

(52) U.S. Cl.

CPC ...... *G06F 11/1469* (2013.01); *G06F 11/0772* (2013.01); *G06F 11/1435* (2013.01); *G06F 11/1451* (2013.01); *G06F 11/1464* (2013.01); *G06F 2201/80* (2013.01)

(58) Field of Classification Search

CPC ............. G06F 11/1469; G06F 11/0772; G06F 11/1435; G06F 11/1451; G06F 11/1464; G06F 2201/80

See application file for complete search history.

(56) References Cited

U.S. PATENT DOCUMENTS

| | | | | |
|---|---|---|---|---|
| 7,809,693 B2 * | 10/2010 | Lango | G06F 16/10 707/686 |
| 10,649,850 B1 * | 5/2020 | Allard | G06F 11/1451 |
| 2016/0321145 A1 * | 11/2016 | Fang | G06F 11/1451 |

(Continued)

OTHER PUBLICATIONS

Muniswamy-Reddy, K., et al., "A Versatile and User-Oriented Versioning File System," Appears in the proceedings of the Third USENIX Conference on File and Storage Technologies (FAST 2004), dated 2004.

(Continued)

*Primary Examiner* — Tony Wu

(74) *Attorney, Agent, or Firm* — Vista IP Law Group, LLP

(57) ABSTRACT

A computer program product, system, and computer implemented method for rapid database restoration using a database restore and recovery process that leverages one or more sparse data files and/or blocks by restoring one or more sparse data files and/or blocks and providing a mechanism to redirect requests to the one or more sparse data files and/or blocks to a backup copy of the actual data files and/or blocks and a process to populate the one or more sparse data files and/or blocks while the database is operational for servicing user requests. The approach includes the creation and population of one or more sparse data files and/or blocks, a redirection mechanism to service read operations where necessary, and a process to restore the data to one or more sparse data files and/or blocks over time, while the database maintains operability.

20 Claims, 19 Drawing Sheets

(56) References Cited

U.S. PATENT DOCUMENTS

| | | | | |
|---|---|---|---|---|
| 2019/0095297 | A1* | 3/2019 | Neall | G06F 11/2082 |
| 2019/0332593 | A1* | 10/2019 | Graham | G06F 11/00 |
| 2020/0042407 | A1* | 2/2020 | Hight | G06F 11/1461 |
| 2020/0334111 | A1* | 10/2020 | Potnis | G06F 16/128 |
| 2021/0286684 | A1* | 9/2021 | Nara | G06F 11/1464 |
| 2022/0237084 | A1* | 7/2022 | Bhagi | G06F 11/2097 |

OTHER PUBLICATIONS

Bolosky, W., et al., "Single Instance Storage in Windows 2000," WSS'00: Proceedings of the 4th conference on USENIX Windows Systems Symposium—vol. 4, Aug. 2000.
Lillibridge, M., et al., "Improving Restore Speed for Backup Systems that Use Inline Chunk-Based Deduplication," USENIX Association, 11th USENIX Conference on File and Storage Technologies (FAST '13), dated 2013.
Paul, S., et al., "Block Level Incremental Backup With Brotli Compression," Copyright 2018, IEEE.
Xia, W., et al., "A Comprehensive Study of the Past, Present, and Future of Data Deduplication," Proceedings of the IEEE, vol. 104, No. 9, Sep. 2016.

* cited by examiner

DATABASE RAPID RESTORE AFTER MEDIA FAILURE

BACKGROUND

Modern computing systems, especially those that service multiple users often rely on databases for storage of data. Unfortunately, like any other system, failures can and do occur. When these systems fail, users may not be able to access the data on said systems until those systems are restored and recovered.

Current techniques to restore and recover rely on a multiphase approach that includes identification of data to be restored, a full restoration of the data to be restored from a backup, and a recovery of the data using redo records that are applied to the restored data. Unfortunately, this takes time. In fact, current techniques have restore and recovery times that are largely proportional to the amount of data being restored. This is because the data that needs to be restored and recovered is copied from a backup. That data must be first read, then transmitted over a network, and finally written to the database. As a result, the time it takes to bring a database back up can vary from minutes, to hours, to days depending largely on the amount of data to be restored.

Therefore, there is a need for an improved approach to restore a database after a media failure that does not suffer from the same drawbacks as prior approaches.

SUMMARY

Embodiments of the present disclosure provide a method, apparatus, and product for rapid restoration of a database after media failure.

The approach disclosed herein generally comprises a database restore and recovery process that leverages one or more sparse data files and/or blocks by restoring one or more data files and/or blocks as one or more sparse data files and/or blocks and providing a mechanism to redirect requests to a sparse data file or block to instead access a backup copy of the actual data file or block. Additionally, this allows for a process to populate the one or more sparse data files and/or blocks while the database is operational for servicing user requests.

Further details of aspects, objects and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. In order to better appreciate the advantages and objects of embodiments of the disclosure, reference should be made to the accompanying drawings. However, the drawings depict only certain embodiments of the disclosure, and should not be taken as limiting the scope of the disclosure. The drawings use like reference numerals to identify like elements, and unless otherwise specified, any description for that element may be applicable to each use of that reference numeral were appropriate.

DETAILED DESCRIPTION OF THE EMBODIMENTS OF THE DISCLOSURE

Various embodiments are described hereinafter with reference to the figures. It should be noted that the figures (FIGS.) are not necessarily drawn to scale. It should also be noted that the FIGS. are only intended to facilitate the description of the embodiment(s) and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated.

Figure 1:
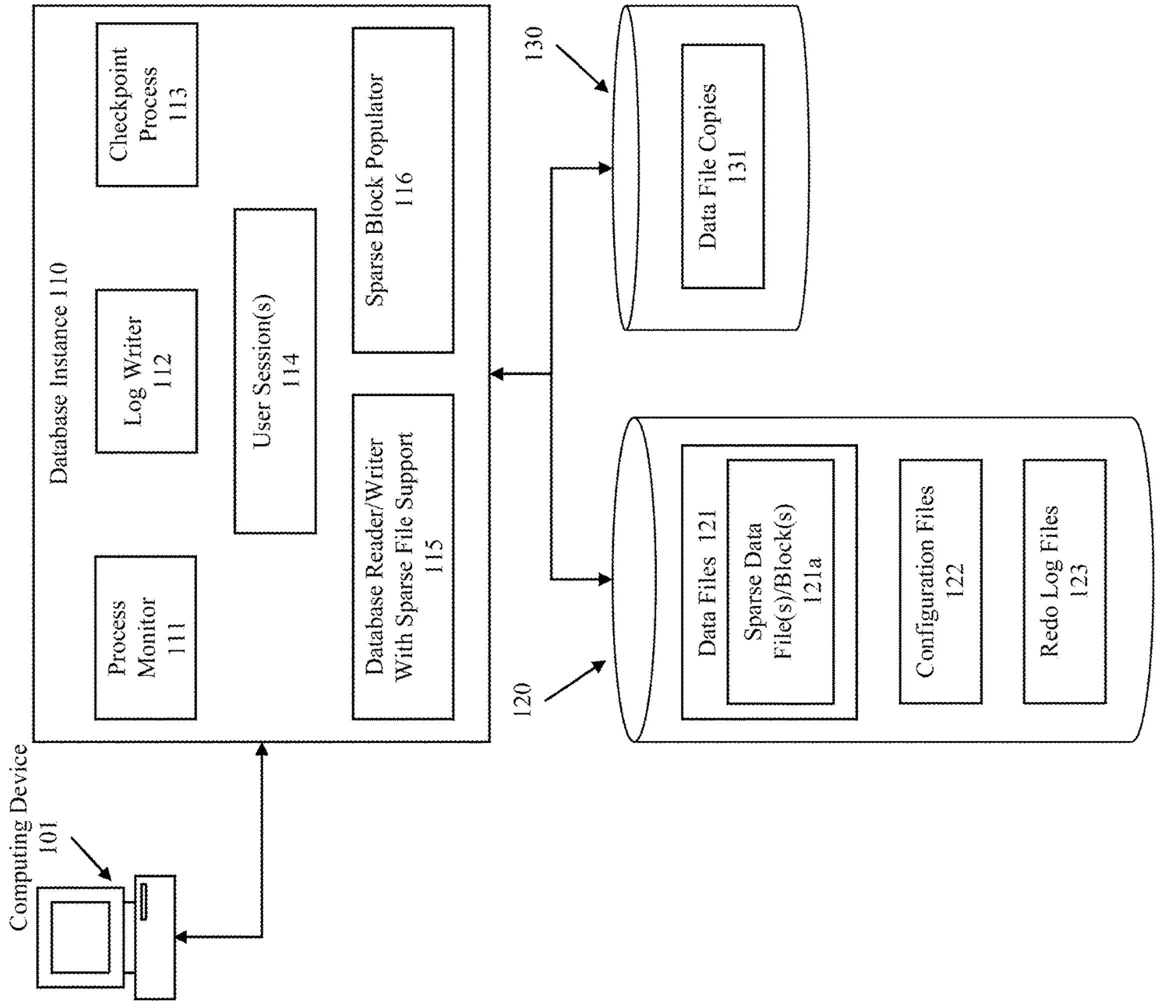
FIG. 1 illustrates a system in which some embodiments of the disclosure are implemented.

FIG. 1 illustrates a system in which some embodiments of the disclosure are implemented. Generally, the system includes a database instance, a first storage system for storing the on-disk representation of a database, and a second storage system for maintaining a point in time backup of data files (generally comprising one or more blocks) that make up the on-disk representation of the database. Such a system might be accessed via user sessions operating from the same (not illustrated) or a different host (e.g., a computing device) different from that of the host for the database instance.

The system includes a computing device 101, a database instance 110, and storage systems 120 and 130. The computing device 101 interacts with the database instance, such as via one or more user sessions (see user session(s) 114). For example, the user device can cause the creation, reading, updating, or deletion of data within the database via interaction with the database instance. Computing device 101 comprises any type of computing device that may be used to operate or interface with the database instance, whether directly or indirectly. Examples of such user computing devices 101 include, for example, workstations, personal computers, laptop computers or remote computing terminals. User computing devices 101 may also comprise any type of portable tablet device, including for example, tablet computers, portable readers, etc. User computing device 101 may also include mobile telephone devices relating to any mobile device that can suitably access any computing systems, as an example, on the Internet such as smartphones and programmable mobile handsets. It is noted that the disclosure is not limited in its application to just these types of devices. The embodiments of the disclosure are applicable to any computing device that works in conjunction with access to digital information stored on a database and accessible over a communications network (e.g., the Internet). One of ordinary skill in the art may appreciate embodiments of this present disclosure may be implemented on the Internet, on a closed network, on a hybrid open and closed network, or on a cloud network, etc.

Database instance 110 includes various processes for interacting with the user, monitoring the database instance, and failure recovery. For example, a process monitor 111 monitors the database instance 110 to detect a failure of the underlying storage for the database instance or the database instance itself. To enable the recovery of the database to a desired state, a log writer 112 might generate set of redo records and store them in a redo log (e.g., redo log files 123). The redo records capture the data necessary to redo already received instructions. In some embodiments, redo records may also be captured in archive logs which may be utilized in the same or a similar way to how redo records are utilized as discussed herein. This is provided so that data files stored at a backup location (e.g., data file copies 131) can be brought up to date (e.g., when copied to the database) if that file is not the latest version. The checkpoint process 113, is provided to identify known good points in the database history that can be used for purposes of recovery. For example, a simple checkpoint process might capture a known good state which might comprise, or correspond to, the data file copies in the backup. The database instance might also advantageously include a database reader and/or writer with sparse file support (see 115) and a sparse block populator (see 116). In some embodiments, the database reader and/or writer with sparse file support 115 and/or the sparse block populator 116 can be instantiated outside of the database instance where the database reader and/or writer with sparse file support 115 is in the data path and performs any necessary redirection of read and/or write requests. The database reader and/or writer with sparse file support 115 provides functionality such that a user session can interact with a database having one or more sparse data files and/or blocks and perform any necessary redirection to the database backup storage 130 with the data file copies 131. The sparse block populator 116 operates in the background while the database is operating with one or more sparse data files and/or blocks 121*a* to populate the one or more sparse data files and/or blocks with data from the data file copies 131 at the backup storage 130. In some embodiment, the database backup storage 130 includes a backup of the configuration files 122 and/or an archive copy of the redo log files 123.

Storage 120 includes the data files 121, the configuration files 122, and the redo log files 123. The data files 121 comprise the working set of data representing the database instance. The configuration files 122 contain one or more configuration files for the database instance. The redo log files 123 contain one or more redo records (also called entries or redo record entries) for the database instance. The data files 121 may also comprise one or more sparse data files and/or blocks 121*a*. For example, in the event of a media failure, during restoration a set of one or more sparse data files and/or blocks are generated that correspond to the data file copies 131, or a subset thereof, maintained at the database backup storage 130. In some embodiments, the one or more sparse data files and/or blocks include a header that references the corresponding data file copy in the backup storage (e.g., data file copies 131 in storage 130). When a user session attempts to read or write to one or more sparse data files and/or blocks, the database instance identifies the request as being to sparse data and redirects the request to the backup data file copy 131—e.g., by reading the header in one or more sparse data files and/or blocks and using the header to identify the location of the backup copy. In some embodiments, the database reader and/or writer with sparse file support 115 or the sparse block populator 116 implements a copy on read approach where the data read from the backup in response to a read or write request is used to populate the corresponding one or more sparse data files and/or blocks. In some embodiments, the data files 121, configuration files 122, and redo log files 123 are stored in the same or different storage devices or sets of storage devices. The data file copies 131 are stored at 130 on a separate storage device(s) from the storage 120.

Figure 2:
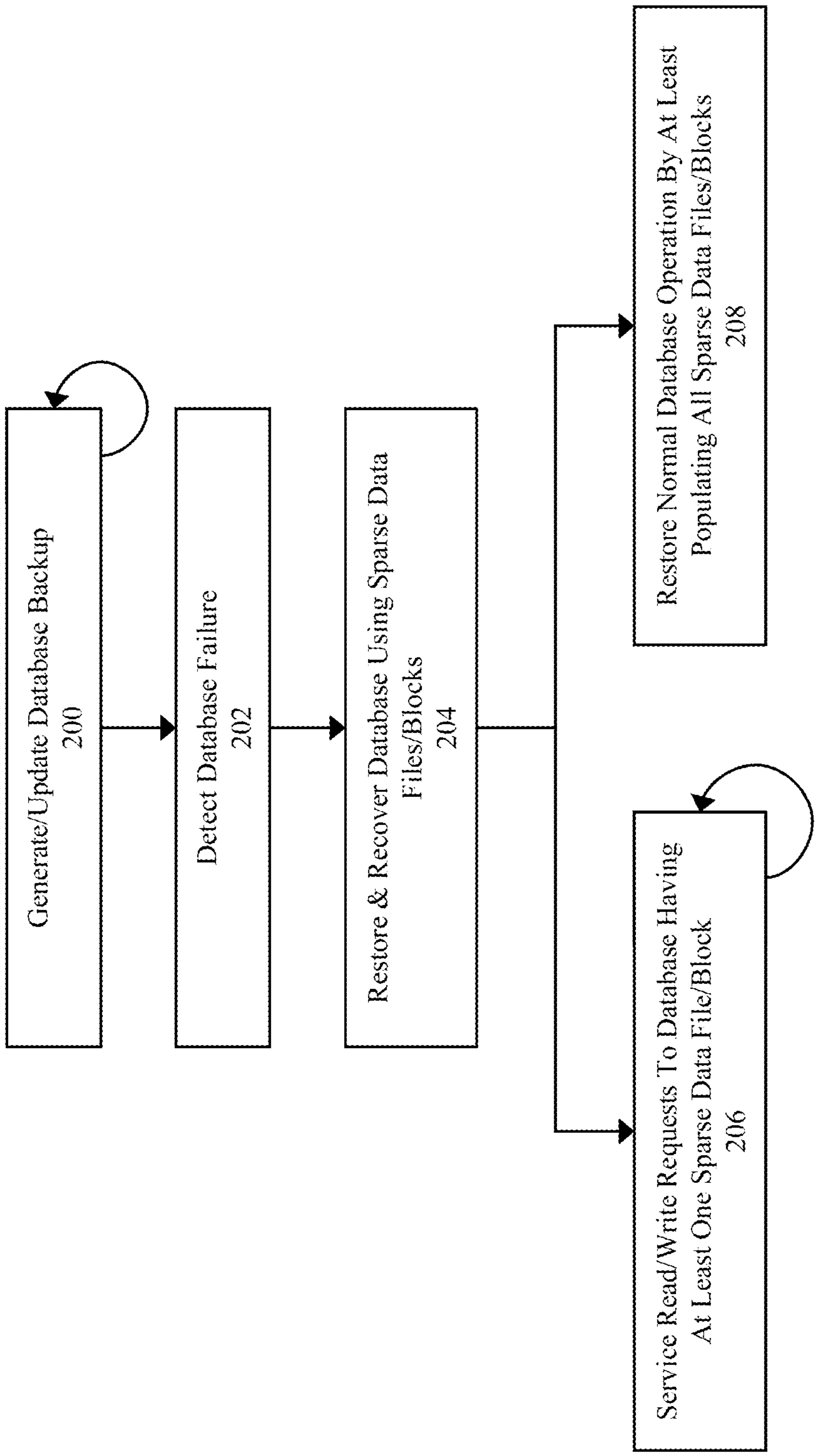
FIG. 2 is a flowchart for rapid restoration of a database after media failure according to some embodiments.

FIG. 2 is a flowchart for rapid restoration of a database after media failure according to some embodiments. Generally, the process comprises detection of a failure and a restore phase and recovery phase process that leverages one or more sparse data files and/or blocks and populates those one or more sparse data files and/or blocks over time. As discussed herein the restoration of the database generally comprises two phases of activities. The restore phase, where one or more data files and/or blocks are restored, and a recovery phase where any necessary redo records are applied. This is distinct from the overall restoration of the database to an operating condition which may comprise one or both of the restoration phase and the recovery phase.

At 200 a database backup is generated using any known techniques. For example, a backup might be generated using a recovery manager (RMAN) system and checkpoint process to create a backup of the database. The generated backup might be updated on an ongoing basis using similar techniques. At some point, a failure is detected at 202. For example, the process monitor might detect that a media device on which the database instance stores one or more data files and/or blocks failed. Such techniques are generally known in the art and tools are provided to manage backups and detect failures.

At 204 the present approach performs implements a restoration and recovery phase for the database using one or more sparse data files and/or blocks. This will be discussed further at least in regard to FIGS. 3 and 5. Briefly, the approach populates the database with one or more sparse data files and/or blocks for data that is corrupted or otherwise untrustworthy in the database storage (e.g., 121 in storage 120), where those one or more sparse data files and/or blocks are to be populated with data at a later time. For example, the process might comprise a determination whether there is a good copy of the control file in the database, mounting the database (e.g., the stored representation in storage 120), determining whether the database requires a full or partial restore, identifying the set of data files to be restored, running an RMAN command that indicates that one or more sparse data files and/or blocks should be used, and recovering the database using redo records.

Once the database is recovered it might include one or more one or more sparse data files and/or blocks. In such an event, the process services read and/or write requests to the database (e.g., from user sessions) using a process that redirects read operations to the data file copies on the backup storage location at 206 when those requests are to one or more sparse data files and/or blocks. This will be discussed further in regard to FIG. 4. Briefly, the approach analyzes the read and/or write requests to determine whether the reference is to a sparse data file or block and if so, performs the redirection.

At 208 the process restores normal database operation by at least populating all one or more sparse data files and/or blocks. An approach to this restoration process is discussed below in regard to FIG. 5. Briefly the process identifies the one or more sparse data files and/or blocks and then processes each in the background to restore the database. In some embodiments, the process also implements copy-on-read where data that is read from the backup is used to populate the one or more sparse data files and/or blocks.

Figure 3:
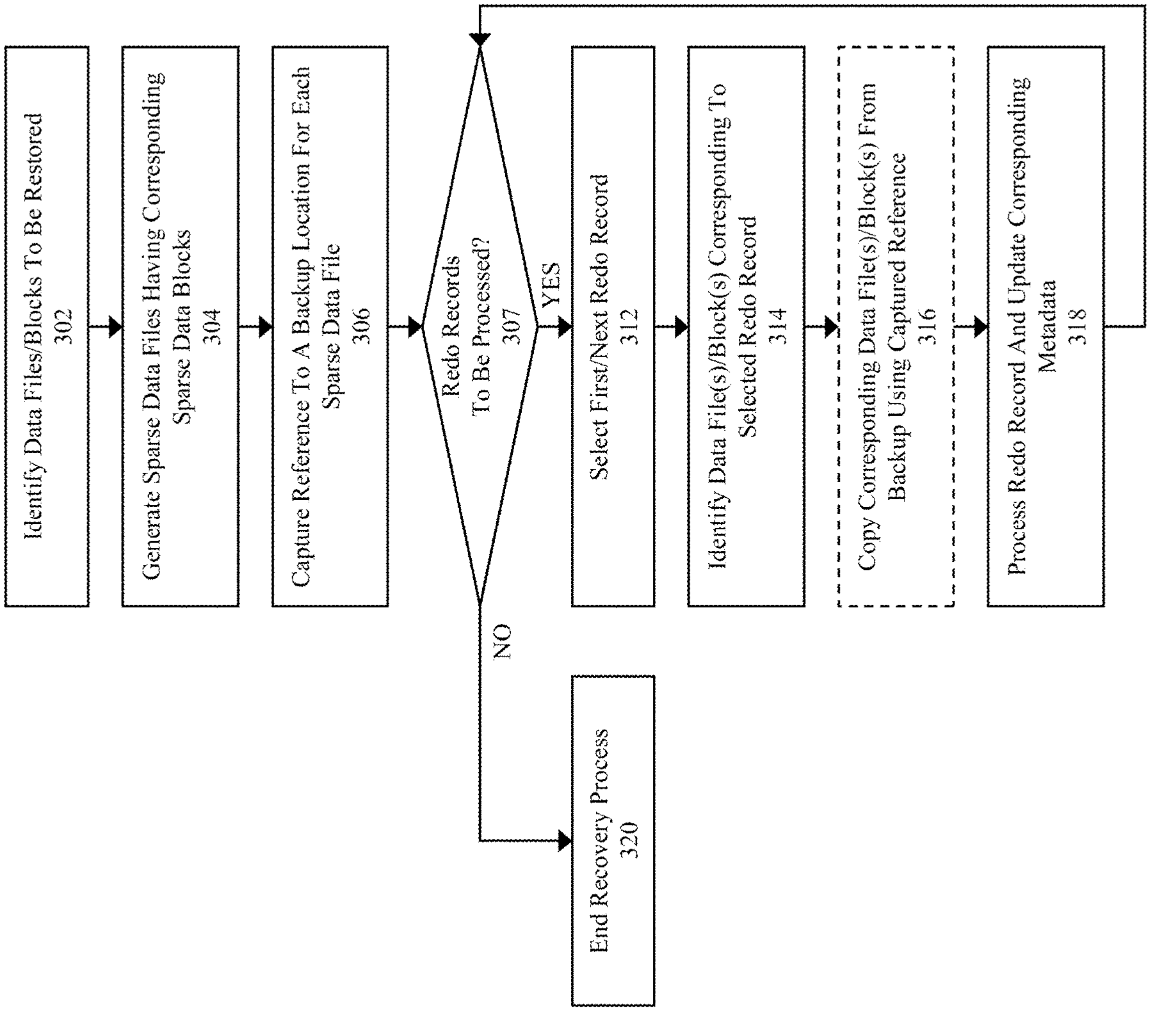
FIG. 3 is a more detailed flowchart for the restoration phase and the recovery phase of a database using one or more sparse data files and/or blocks according to some embodiments.

FIG. 3 is a more detailed flowchart for the restoration phase and the recovery phase of a database using one or more sparse data files and/or blocks according to some embodiments. Generally, the approach includes sparse data file and/or block generation during a restoration phase and potentially populating at least some of those one or more sparse data files and/or blocks during the recovery phase. This is distinct from the overall restoration of the database to an operating condition which may include both the restoration and the recovery phase.

The restoration phase, as illustrated here, includes the approach discussed in regard to blocks 302, 304, and 306. This restoration phase essentially creates the structure in which data is to be populated without populating that structure completely. During the restoration phase one or more sparse data files and/or blocks are created in the database to be populated with data at a later time. In some embodiments, the recovery phase is initiated after making the database available. In such an embodiment, read and/or write requests are processed at least by determining whether there is a relevant redo record that needs to be applied before servicing the read and/or write request. This approach might be implemented by triggering at least the process of 314, 318, and possibly 316 is response to a read and/or write request that references a file or block that is associated with a redo record and might be triggered by a separate determination that the read and/or write request corresponds to a redo record that has not yet been processed.

In some embodiments, the process starts at 302 where one or more data files and/or blocks to be restored are identified. Generally, approaches to identify such data files and/or blocks are known in the art. For example, the process could rely on snapshots, checkpoints, information specifying which data files and/or blocks are stored on a device that is determined to have failed, a sequence number or range, a time a relevant failure occurred, a highest contiguous sequence number completed, or any combination thereof. Additionally, in some embodiments, all database files and blocks are identified for restoration. In some embodiments, the data files and/or blocks to be restored are identified by a user, possibly in response to a report or notification from a database monitoring tool.

Regardless of the technique used to identify what data files and/or blocks to restore, the process subsequently generates one or more sparse data files and/or blocks corresponding to the identified one or more data files and/or blocks at 304. In some embodiments, only sparse data files are created where those sparse data files might be constructed from one or more data blocks. In some embodiments, sparse data blocks are created instead of or in addition to the data files. In some embodiments, each of one or more sparse data files and/or blocks are associated with a set of metadata that identifies the corresponding one or more data files and/or blocks at the backup location, —e.g., by capturing a reference to a copy at a backup location for each corresponding data file and/or block (see 306). For instance, the one or more sparse data files and/or blocks, individually or as a whole, include a header that provides an address which references the location of a backup copy of the corresponding one or more data files and/or blocks at the backup location. In some embodiments, the metadata is maintained in a separate metadata registry that can be referenced to determine where corresponding data is stored at the backup location and possibly whether a particular request corresponds to one or more sparse data files and/or blocks. In some embodiments, a file contains one or more references to the storage locations of the blocks that make up the corresponding data file copy, and each block within the file includes a header that comprises a set of data that indicates whether the block is sparse.

The recovery phase, as illustrated here, includes the approach discussed in regard to blocks 307, 312, 318, and possibly 316. At 307 the recovery phase is started by first determining whether there are redo records to be processed. If there are no redo records to be processed, the process ends at 320. The redo records themselves can be identified based on the information from the restoration phase. For example, redo records may be identified based on the restoration checkpoint record and the target time—e.g., all redo records after the restoration checkpoint to a current, or past, time are to be applied. Similar approaches might be applied when using snapshots or other data structures or sequence numbers (e.g., redo records with a sequence number after that of the restored checkpoint or snapshot). In this way, redo records are applied to bring the restored database to a state at a target time which is a recovered state.

At 312 a first/next redo record is selected—e.g., from redo log files 123—when there are one or more redo records to be processed. Generally, redo records are arranged in series based on the time they are received or executed. Processing redo records must also follow this timing relationship as well. This is because one redo record can overwrite at least a portion of the changes from another redo record. Thus, if redo records are processed out of sequence inconsistent results might be achieved.

After a redo record is selected, any data files and/or blocks corresponding to the selected redo record are identified at 314. For example, the redo record is analyzed to identify the corresponding data files and/or blocks—e.g., using an address in a set of metadata or associated with the redo record. For example, a bloom filter or other index like structure could be maintained to capture an association with a sparse data characteristic. In some embodiments, the bloom filter is represented by a bitmap. The bloom filter or index structure might have a one-to-many relationship to database files and/or blocks where an entry (e.g., a binary flag) within the bloom filter or index structure indicates that at least one of the database files and/or blocks are sparse.

If the redo record corresponds to one or more sparse data files and/or blocks, the process will continue at 316 by fetching the backup copy of the data files and/or blocks. A sparse data file and/or block could be identified in different ways. For example, a bloom filter or other index like structure could be maintained to capture an association with a sparse data characteristic and accessed to determine whether a corresponding data file or block is or might be sparse. In some embodiments, the bloom filter is represented by a bitmap. The bloom filter or index structure might have a one-to-many relationship to database files and/or blocks where an entry (e.g., a binary flag) within the bloom filter or index structure indicates that at least one of the database files and/or blocks are sparse. In some embodiments, additional metadata might be necessary to determine whether a potentially sparse data file or block is actually sparse, such as by analyzing a data file or block header to sparse data file metadata structure that individually tracks sparsity. If the data file or block is actually sparse the corresponding backup copy will need to be fetched. In some embodiments, a fetched backup copy of the data files and/or blocks is stored in the database in a non-volatile storage device. In some embodiments, the fetched backup copy of a data file and/or block is stored in a temporary storage area that allows for quicker operations such as applying a redo record (e.g., in RAM, a caching structure, or a higher tier storage device that can be more quickly accessed). In some embodiments, when data files and/or blocks are fetched from the backup location, metadata is updated to reflect that the data files and/or blocks in the database are no longer sparse, e.g., by updating the corresponding metadata to remove a reference to the copy of the data files and/or blocks at the backup location.

At 318, the selected redo record is processed and corresponding data files and/or blocks are updated as needed. Once the selected redo record is applied, the process returns to 307 until there are no more redo records to be processed. In some embodiments, the selected redo record is applied to an in-memory copy of the data files and/or blocks, and subsequently written to a database storage area. In some embodiments, the fetched backup copy is stored in memory allocated to the database and the corresponding update represented in the redo record is applied to the copy while it is in memory before storing the fetched backup copy in the database storage area.

Figure 4:
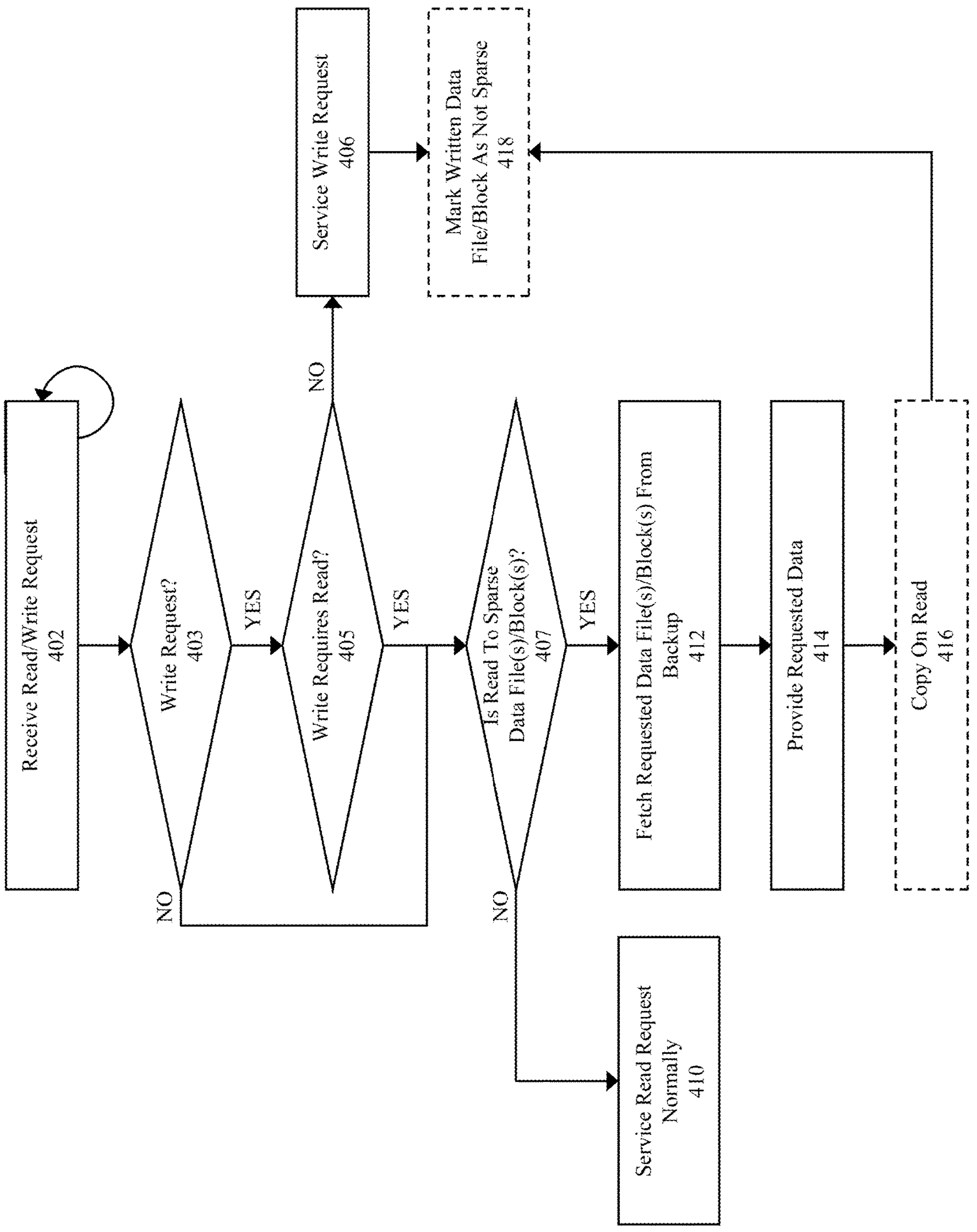
FIG. 4 is a more detailed flowchart for servicing read and/or write requests to a database having one or more sparse data files and/or blocks according to some embodiments.

FIG. 4 is a more detailed flowchart for servicing read and/or write requests to a database having one or more sparse data files and/or blocks according to some embodiments. Generally, the process includes an approach that will determine whether an access is needed to the backup storage instead of, or in addition to, accessing the normal database storage.

The process starts at 402 when a read and/or write request is received. For example, a read and/or write requested is received for a user session 114. The request is processed to determine whether it is a write request at 403 and if the write request does not require a read operation as determined at 405 the write request is serviced as normal at 406. In some embodiments, when a write request is serviced the corresponding metadata is updated to indicate at least that any corresponding data files and/or blocks are no longer sparse if applicable (see 418)—e.g., when the write request writes or overwrites a sparse block or file in full.

If the request is a write request (which requires a read operation) or is a read request, a determination is made at 407 as to whether the read operation is to a one or more sparse data files and/or blocks. For example, for each data file or block needed to service the request, an index or other data structure (e.g., bloom filter) might be referenced to determine if the read operation is to a data file or block address that is currently sparse, and/or the data file or block itself is processed to determine whether it is actually sparse. In some embodiments, the index or other data structure indicates that the data file or block might be sparse, and the corresponding data file or block must be processed to determine whether it is actually sparse. If the requested data file and/or block is not sparse, the read request is services normally at 410.

If the read operation is to a one or more sparse data files and/or blocks the process continues at 412 where the requested one or more data files and/or blocks are fetched from the backup and provided to the user requestor at 414. In some embodiments, the retrieved data is also copied to the database storage at 416, and the appropriate metadata is updated at 418 as discussed herein. For example, the metadata is updated to indicate that the retrieved data files and/or blocks are not sparse by adding or removing a value indicating such and/or by removing a reference to a backup location (see 418).

Figure 5:
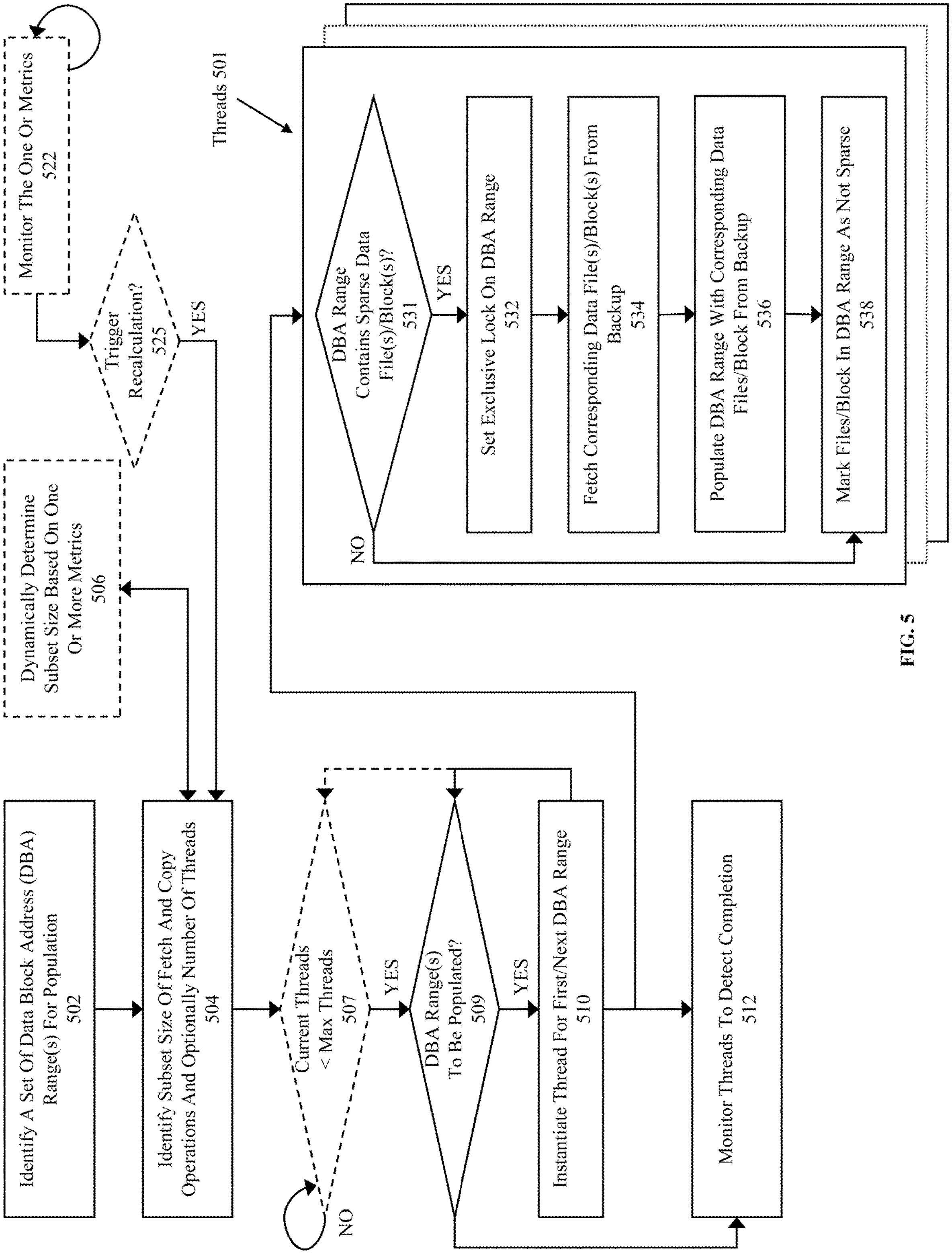
FIG. 5 is a more detailed flowchart for restoration of normal database operation by at least populating all the one or more sparse data files and/or blocks according to some embodiments.

FIG. 5 is a more detailed flowchart for restoration of normal database operation by at least populating all the one or more sparse data files and/or blocks according to some embodiments. Generally, the process operates in the background to populate the one or more sparse data files and/or blocks with the corresponding copied data from the backup. In some embodiments, the process is dynamically controlled to be based on one or more metrics to control the size of the data being fetched and/or the number of threads that can operate at any given time.

The process starts at 502 where a set of data block address (DBA) range(s) are identified for population. In some embodiments, a bloom filter is created that has a value corresponding to each DBA, or a set of DBAs (which may correspond to a respective file), in the database and where each corresponding value is either set or not set to indicate that the DBA, or set of DBAs, include, or do not include, one or more sparse data files and/or blocks. In some embodiments, each entry in the bloom filter corresponds to a hash of one or more files/DBAs. For example, by applying a hashing function, multiple files or DBAs might map to the same value/location within the bloom filter. This would help minimize the amount of resources consumed by the filter but may also result in indeterminate results from the bloom filter (e.g., false positives or negatives—e.g., a bloom filter value might indicate that the data is sparse when it is not). In some embodiments, the bloom filter is maintained in memory. Additionally, while an index structure with a strict one to one mapping between files/DBAs is not necessarily a bloom filter (e.g., an index or lookup table) to ease understanding herein a bloom filter and a 1-to-1 mapping structure will be discussed without distinction unless otherwise specified herein. In some embodiments, a set of metadata is maintained that specifies which data files and/or blocks are or are not sparse. In some embodiments, said metadata is maintained in a header for each of the one or more sparse data files and/or blocks that indicates whether the data files and/or blocks are sparse.

At 504 a subset size for fetch and copy operations and optionally a number of threads is identified. For example, the subset size might be fixed, user-configured, or dynamically determined based on one or more metrics at 506. For example, the metrics might comprise CPU utilization level, I/O load, memory available, network bandwidth, block or chunk size, average throughput, lock collisions, number of pending requests, a target population time, quota/shares from a database resource manager plan or any other relevant parameter. In addition, at 522 the one or more metrics can be monitored such as to determine if a threshold amount of change has occurred to any of the one or more metrics. If threshold is exceeded, as determined at 525, the process will trigger recalculation of the size of the fetch and copy and/or the number of threads.

At 507 it is optionally determined whether the number of threads currently operating to restore data in one or more sparse data files and/or blocks is less than the maximum number of threads determined at 504 to manage the number of threads currently processing in a multithreaded scenario. If the number of threads currently operating to restore data in one or more sparse data files and/or blocks is at max limit, the process will wait a period of time before again determining whether the current number of threads are less than the maximum number of threads.

At 509 it is determined whether there are any data block address (DBA) Range(s) to be populated. For example, the determination could be performed by first processing an index structure or bloom filter to determine if a candidate DBA range corresponds to one or more potentially sparse data files and/or blocks. Once a range is identified at 509 the process continues to 510 where a thread is instantiated to process a DBA range. Operation of the threads is discussed in regard to 501. Additionally, any thread that is instantiated at 510 is monitored at 512 to detect successful completion or failure. In some embodiments, once a thread is instantiated, the process returns to either 507 or 509 to continue processing which may occur during or after the execution of the thread.

Any of threads 501 might comprise items listed here including 531, 532, 534, 536, and 538. The thread processing starts at 531 where a determination is made as to whether the DBA range that the thread is started for actually includes one or more sparse data files and/or blocks at 531. As discussed herein, some processes might include a bloom filter or other index type structure that does not have a one-to-one correspondence to each block or at least does not fully specify whether a one or more sparse data files and/or blocks has been fully populated with data from the corresponding data file copy at the backup location. To address this, the process at 531 accesses metadata for the DBA range to determine whether the DBA range actually includes one or more sparse data files and/or blocks. If the metadata indicates that the DBA range is already populated, the process proceeds to 538 which as discussed below updates the corresponding metadata where appropriate.

At 532, an exclusive lock is placed on the DBA range. For example, the DBA range might correspond to two data blocks. At 534, any corresponding data files and/or blocks are fetched from the backup. The fetched data files and/or blocks are then used to populate the DBA range (the one or more sparse data files and/or blocks) with the correct data at 536. Finally, at 538 any corresponding metadata is updated such as by marking the blocks as not sparse, removing references to a backup location for those blocks, or otherwise marking the DBA range as fully populated or removing it from a set of ranges to be populated.

Figure 6A:
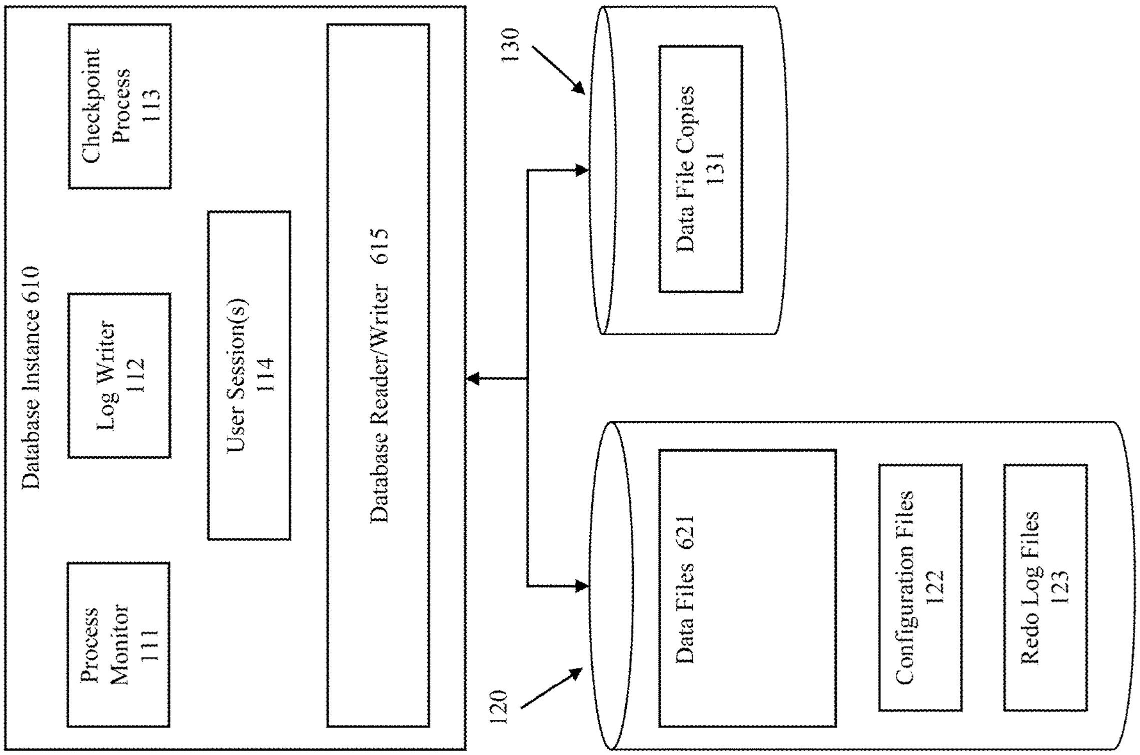
FIGS. 6A-6E illustrate an example flow for failure, the restoration phase, and the recovery phase according to some embodiments.

FIGS. 6A-6E illustrate an example flow for failure, the restoration phase, and the recovery phase according to some embodiments. FIG. 6A has at least some of the elements from FIG. 1 identified by the same identifier. To the extent that the example here is not contrary to the description in FIG. 1, the description of like identified items in regard to FIG. 1 applies here.

Database instance 610 is similar to database instance 110 and includes a process monitor 111, a log writer 112, a checkpoint process 113, and one or more user sessions 114. However, database instance 610 does not include the database reader and/or writer with sparse file support 115 and a sparse block populator 116. Instead, the database instance includes a database reader and/or writer module 615 to service user session reads/writes. As illustrated here, database reader and/or writer 615 does not include support for one or more sparse data files and/or blocks. This is because the database instance 610 as illustrated in FIG. 6A is operating in a normal mode without sparse data files.

In addition to the database instance FIG. 6A includes database storage 120 having data files 621, configuration files 122, and redo log files 123. Here configuration files 122 and redo log files 123 are equivalent to those discussed in regard to FIG. 1. However, the database files 621 are different in that they currently do not include and one or more sparse data files and/or blocks. Additionally, storage 130 contains a backup of the database data files 621 at 131 similar to 131 discussed in FIG. 1.

Figure 6B:
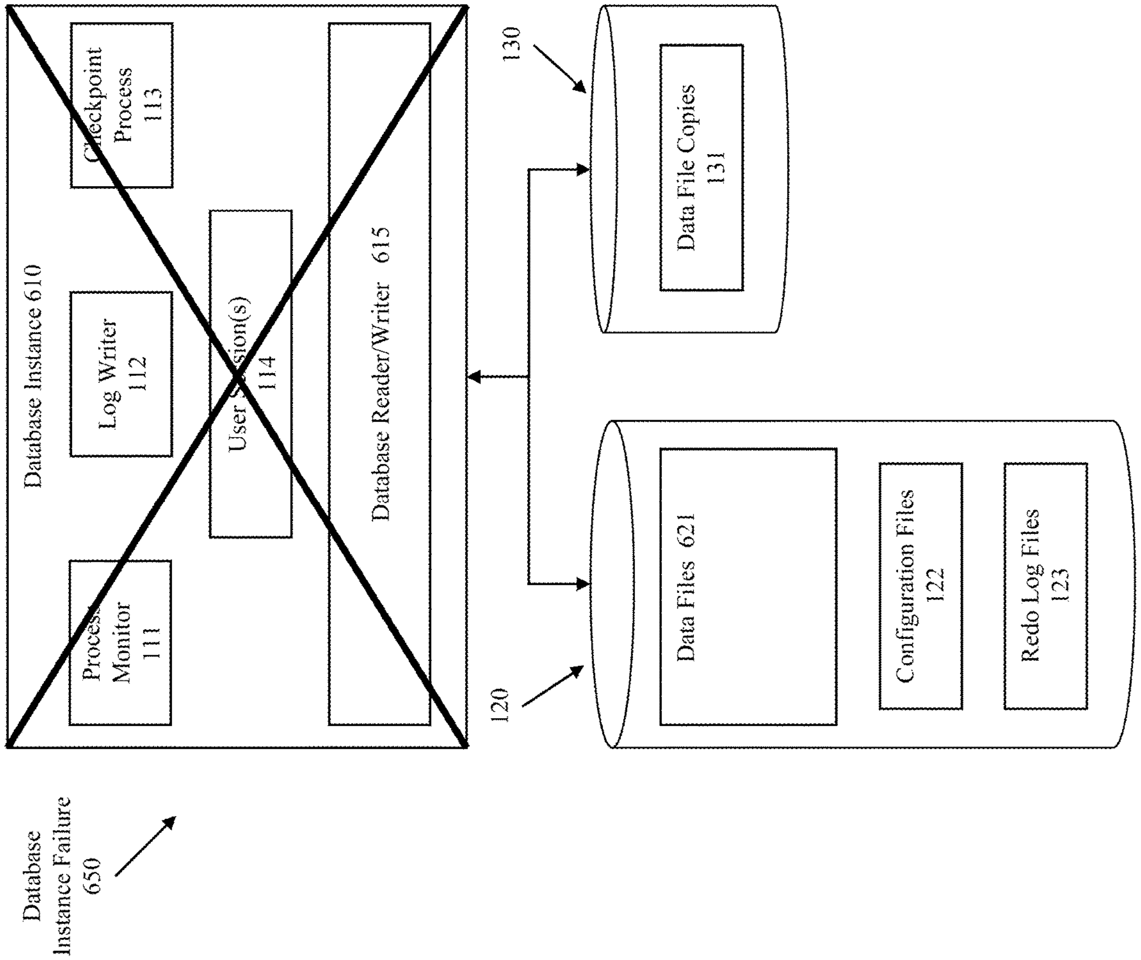

FIG. 6B illustrates the failure of database instance 610 at 650. This might be caused by any number of reasons. For instance, the system on which the database is operating might fail, a storage device used to store at least some of the data files 621 might fail, or a connection between any of the component used to support database instance 610 might fail.

Figure 6C:
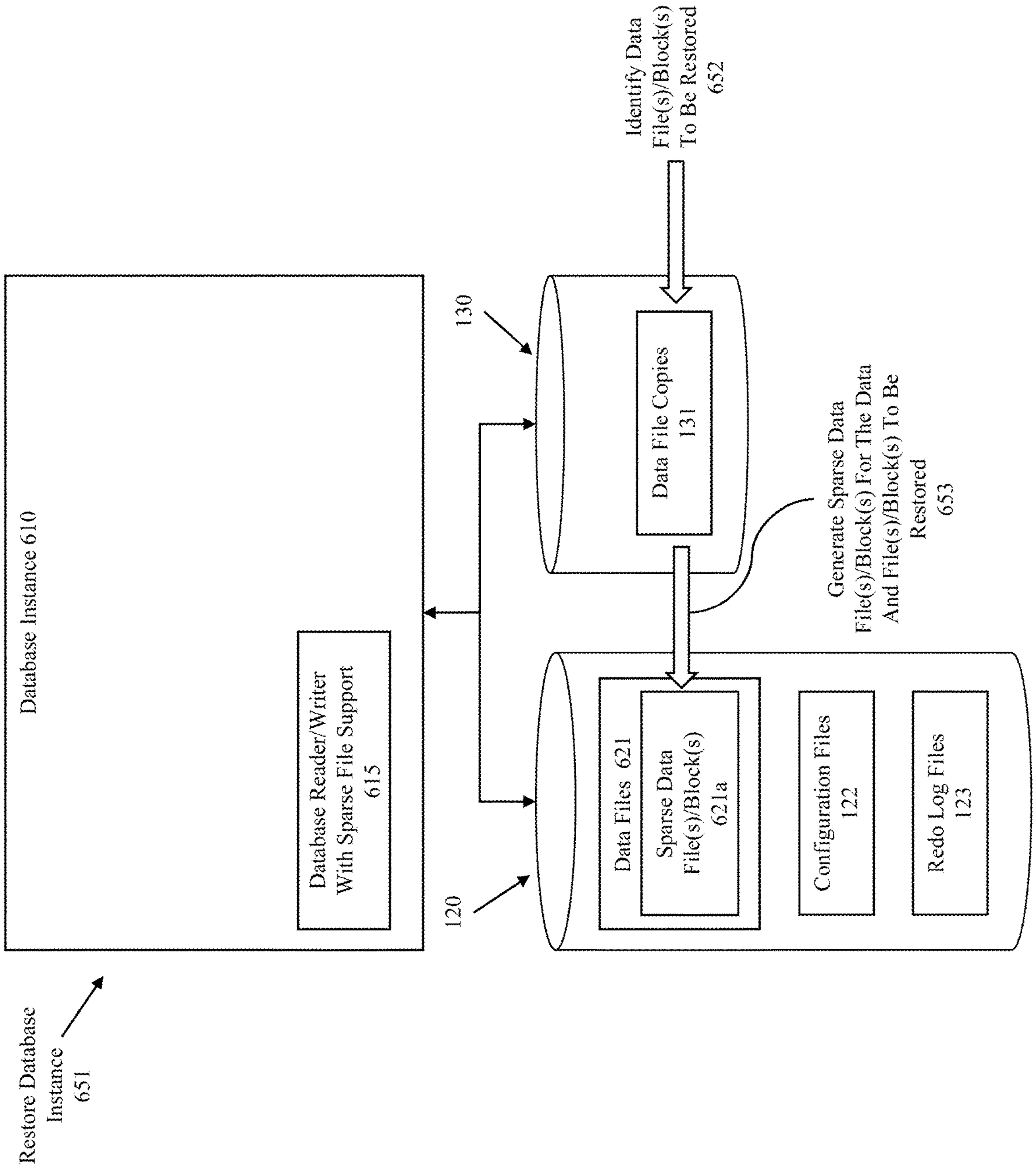

FIG. 6C illustrates the restoration phase of database instance 610 at 651. This might be accomplished using a database reader and/or writer with sparse file support (see 615) or another/different element possibly external to the database instance. As illustrated, the restoration phase includes identifying the data files and/or blocks to be restored at 652. Once the data files and/or blocks are identified corresponding sparse data files and/or blocks are generated and stored in the data files 621 (see one or more sparse data files and/or blocks 621*a*).

Figure 6D:
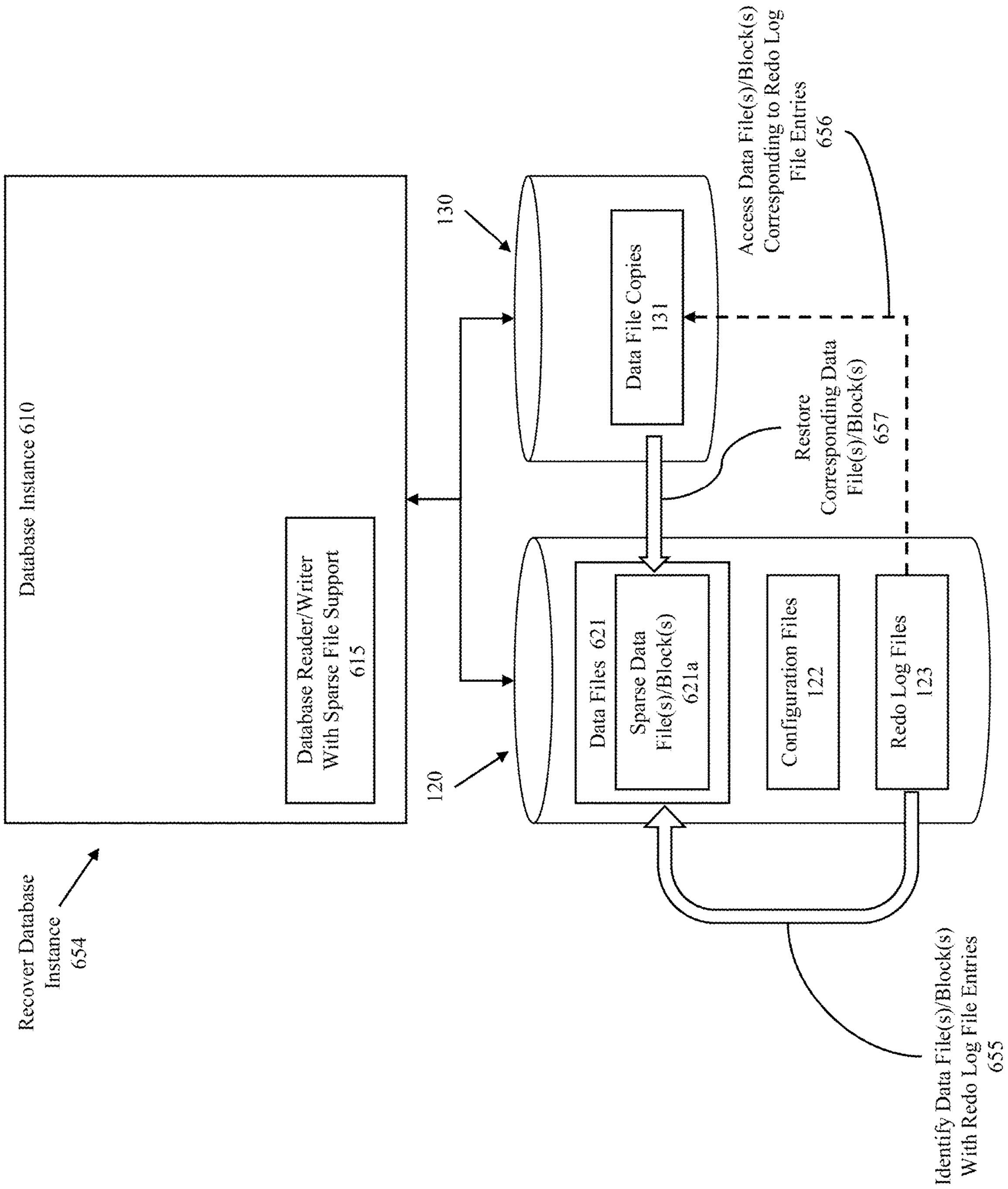

FIG. 6D illustrates the recovery phase of the database instance 610 at 654. This might be accomplished by processing the redo records and performing the necessary fetch and store operations. For example, redo log file entries are processed sequentially by first identifying data files and/or blocks with redo log file entries at 655, accessing at the backup location copies of the corresponding data files and/or blocks from the data file copies 131. Finally, the data files and/or blocks fetched from the data file copies 131 are stored in the data files 621, possibly after applying the redo records obtained from redo log files 123.

Figure 6E:
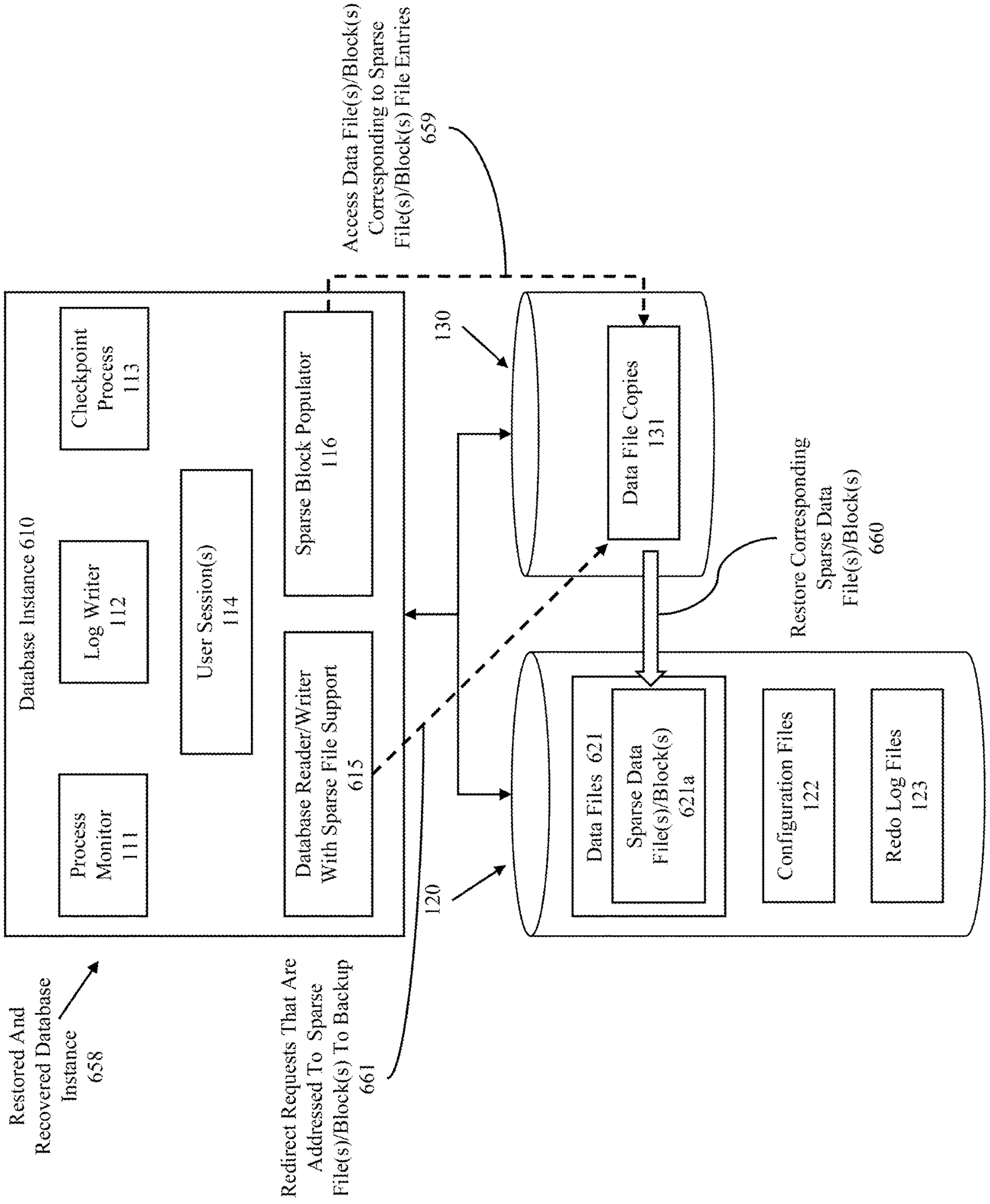

FIG. 6E illustrates the operation of the restored and recovered database instance 610 (see 658). As illustrated here, the database instance 610 includes a sparse block populator 116 in addition to the database reader and/or writer with sparse file support 615. The sparse block populator 116 accesses the data files and/or blocks corresponding to the sparse data files and/or blocks from the data files copies 131 (see 659) and uses them to populate the sparse data files and/or blocks 621*a* (see 660) while the database reader and/or writer with sparse file support 615 can service user session requests by redirecting requests to the data file copies at the backup storage (see 661).

FIGS. 7A-7G illustrate an example flow for populating all one or more sparse data files and/or blocks according to some embodiments. As illustrated here, the example utilizes a bloom filter to represent the sparse or not sparse state of the data files and/or blocks. The example here is essentially a continuation of the FIG. 6A-6E where the description of like identified items for FIGS. 6A-6E also apply to FIGS. 7A-7G.

Figure 7A:
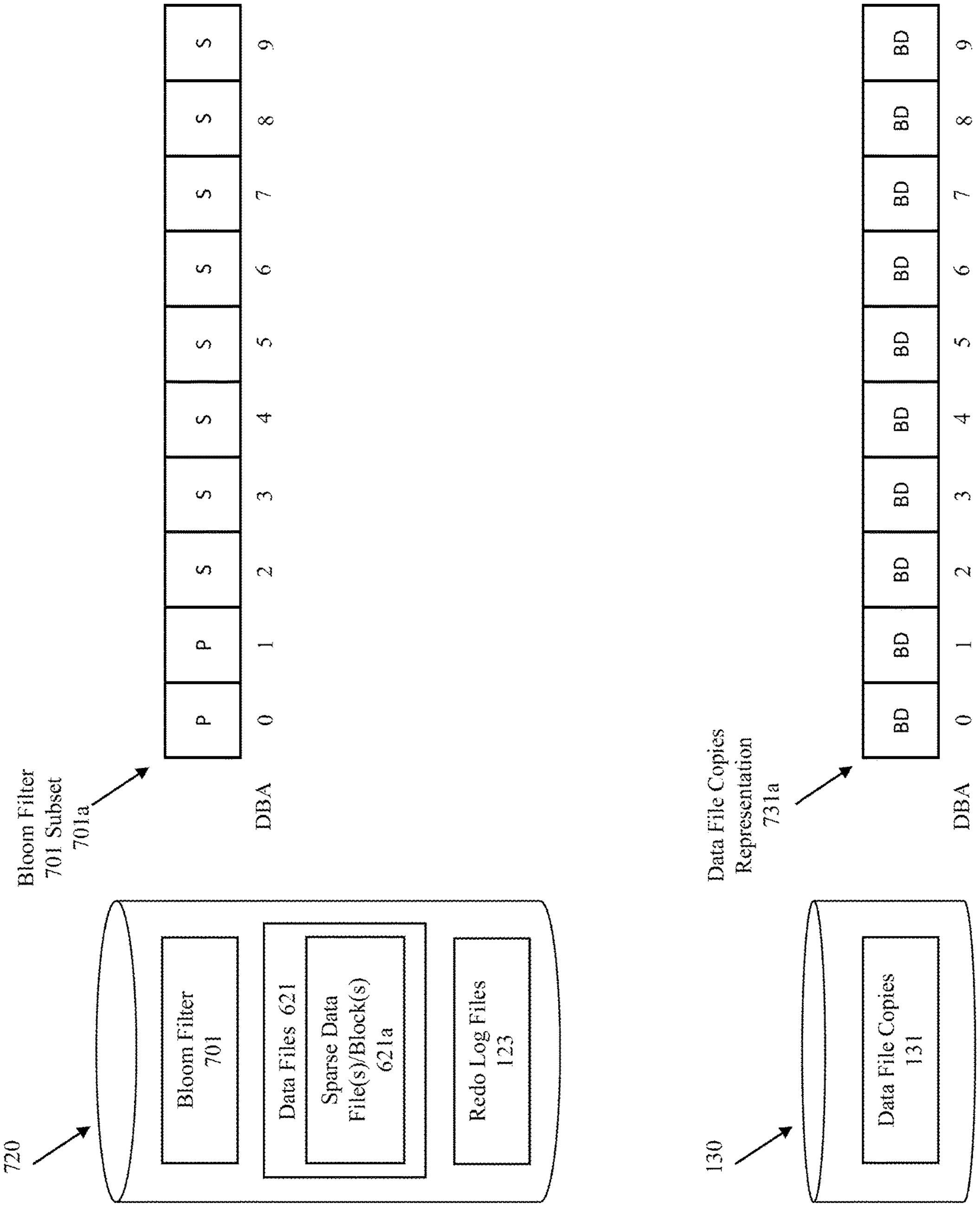
FIGS. 7A-7G illustrate an example flow for populating all one or more sparse data files and/or blocks according to some embodiments.

FIG. 7A adds a bloom filter 701 to the storage 120 of FIG. 6A which is now labeled as 720. The bloom filter 701 might comprise any number of subsets such as subset 701*a*. As illustrated, the subset corresponds to at least DBAs 0-9. Each block has a corresponding flag which indicates that any corresponding data files and/or blocks are either not sparse or at least possibly sparse (see e.g., DBA 2-9). In some embodiments, the bloom filter entries correspond to a data file instead of a data block. In some embodiments, a block might be marked as non-sparse when data has not been populated in the block. In some embodiments, a block might be marked as populated only if the corresponding data file is fully populated, or when some but not all data has been populated in the corresponding data file.

To simplify the illustration, data file copies are represented in a similar arrangement at 731*a*, where the corresponding DBA is illustrated in a similar structure. However, in an actual implementation the data files and/or blocks will be located at a specified address (e.g., DBA), not within the bloom filter itself.

Figure 7B:
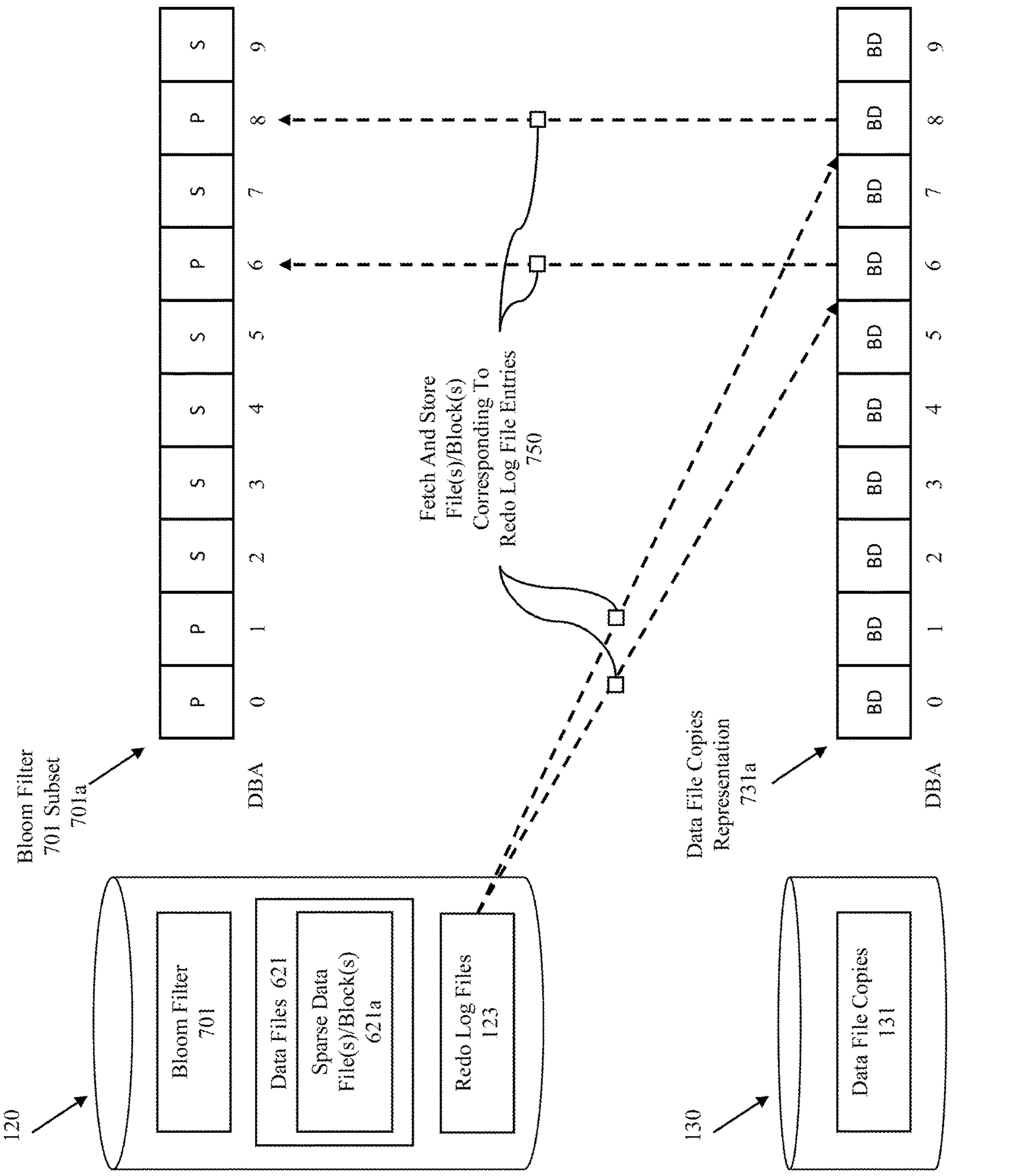

FIG. 7B illustrates the interaction with regard to the recovery operations and the bloom filter. In particular, the redo log files 123 are processed. This processing might correspond to redo record entries in the redo logs that reference at least some sparse data blocks. For example, redo record entries illustrated here correspond to DBA 6 and 8. To process the redo record entries the process will fetch and store (see 750) any corresponding blocks data files and/or blocks from the data file copies 131 (as illustrated for DBAs 6 and 8 in representation 731*a*) and to the data files 621*a* (as illustrated for DBAs 6 and 8 in representation 701*a*). As can be seen in FIG. 7B the bloom filter has been updated at 6 and 8 to indicated that the corresponding blocks have been populated.

Figure 7C:
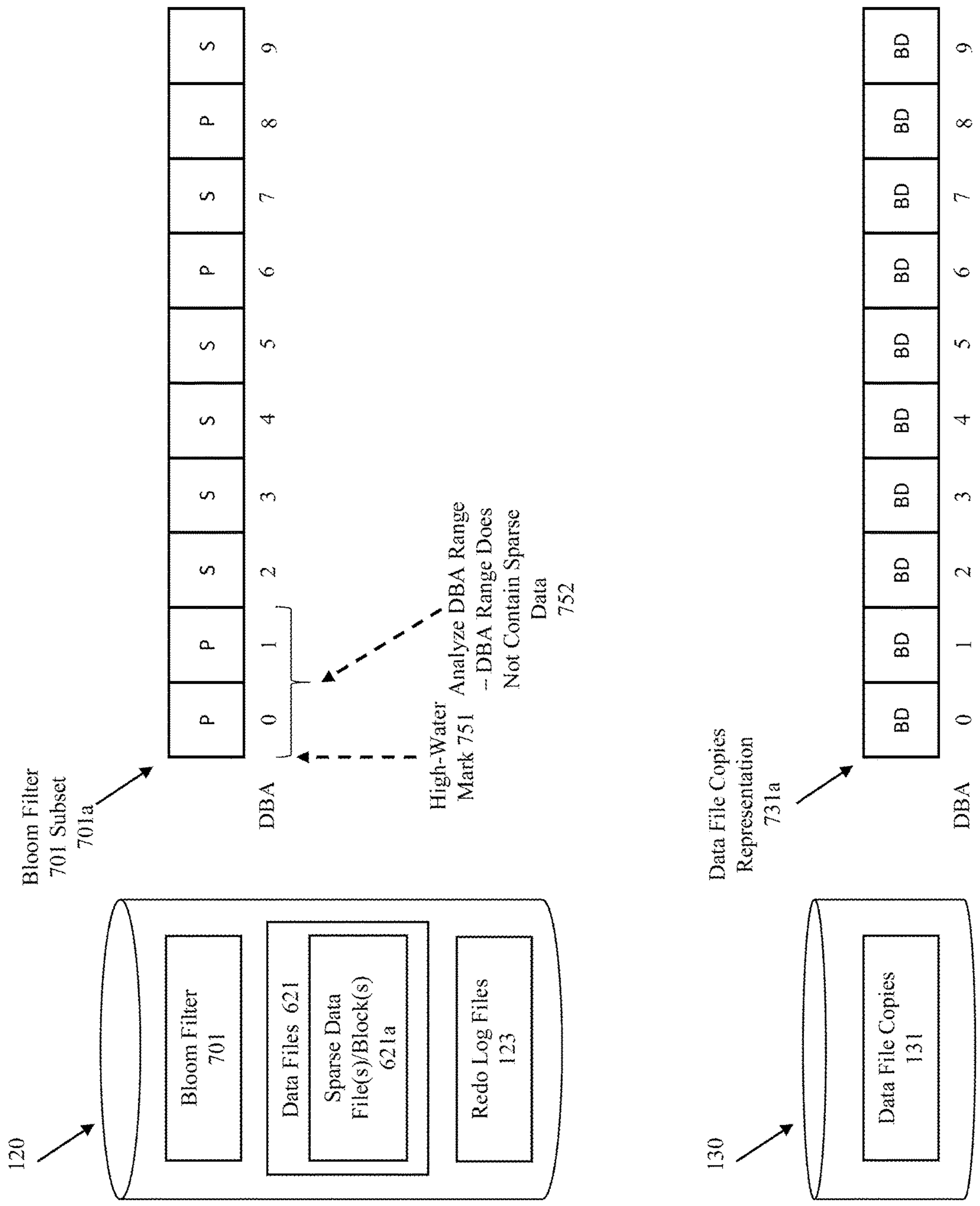

FIG. 7C illustrates the start of the operation of the sparse block populator. The process starts by marking a location with a high-water mark at 751. Because the process is just starting the initial location is identified as the starting point corresponding to the bloom filter. Once the starting location is determined, the process will analyze a corresponding DBA range that starts at the high-water mark (See 751 and 752). For the sake of this example, the range is two blocks. Additionally, the approach illustrated here in FIG. 7A-7G does not address the multithreaded approach. In some embodiments, the high-water mark is advanced once a DBA range is assigned to a process for processing. However, the example here moves the high-water mark only after the DBA range finishes being processed. At 752 the process will analyze the DBA range and make a determination of whether the DBA range includes sparse data. Here it is concluded that the DBA range does not include sparse data.

Figure 7D:
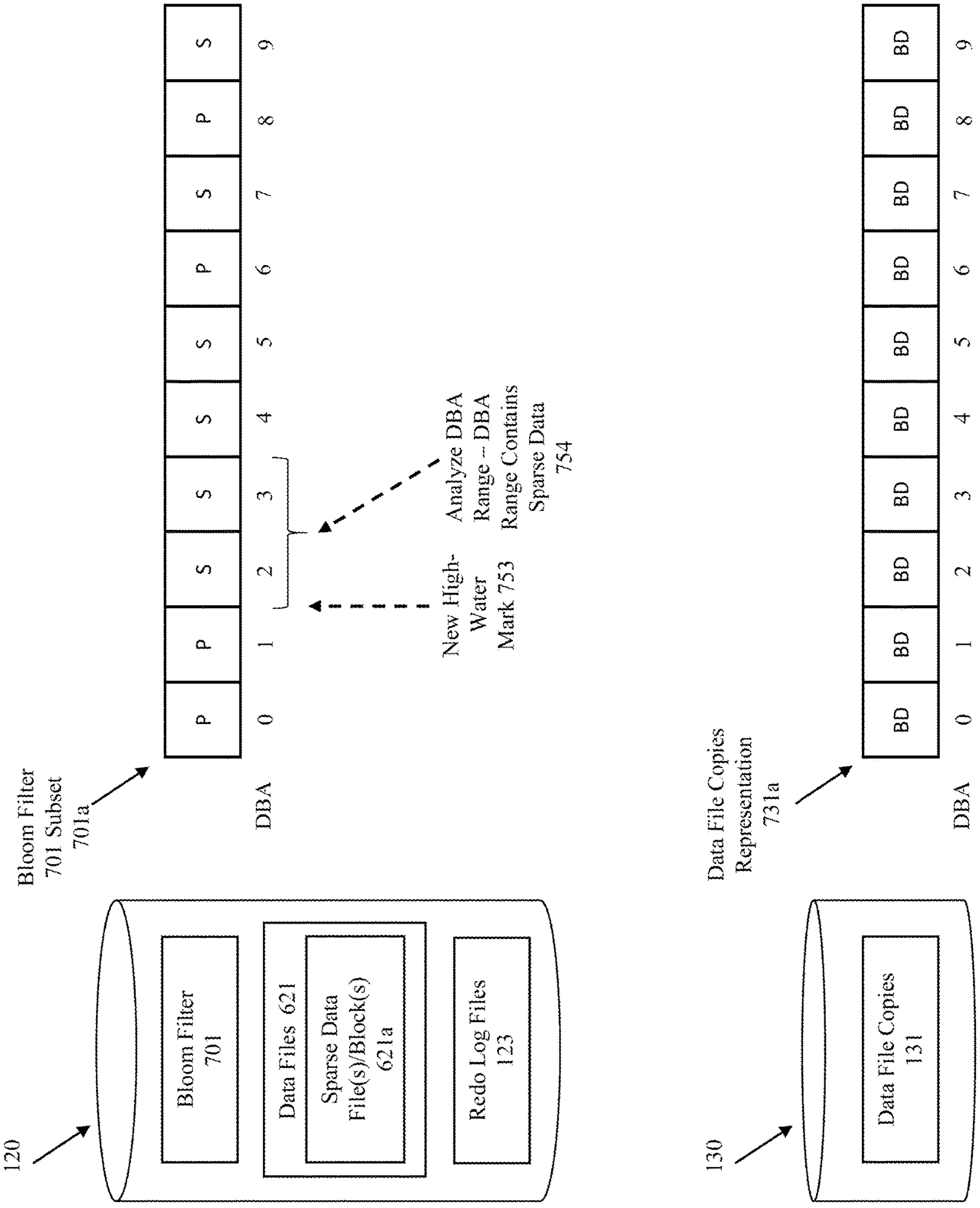
Figure 7E:
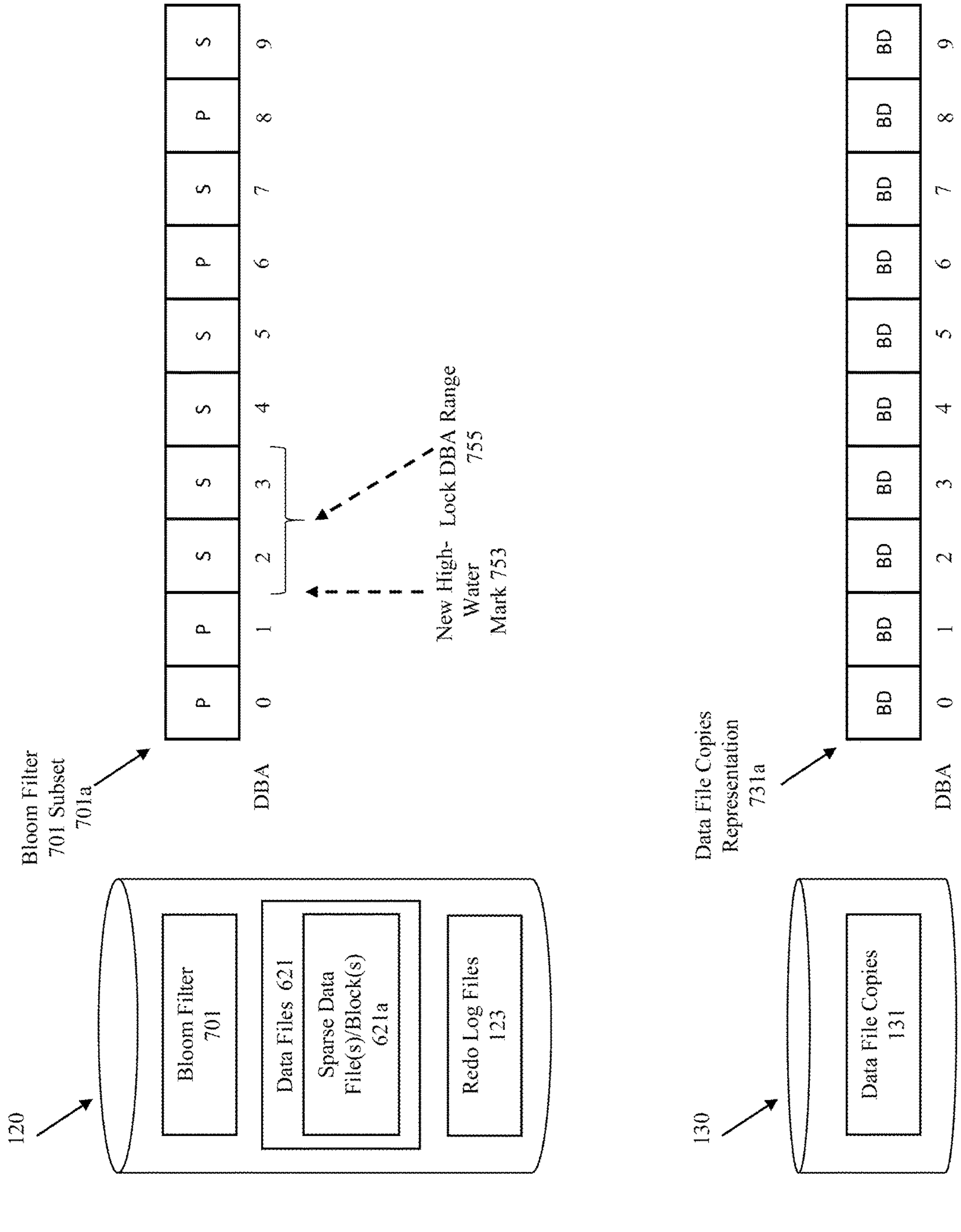
Figure 7F:
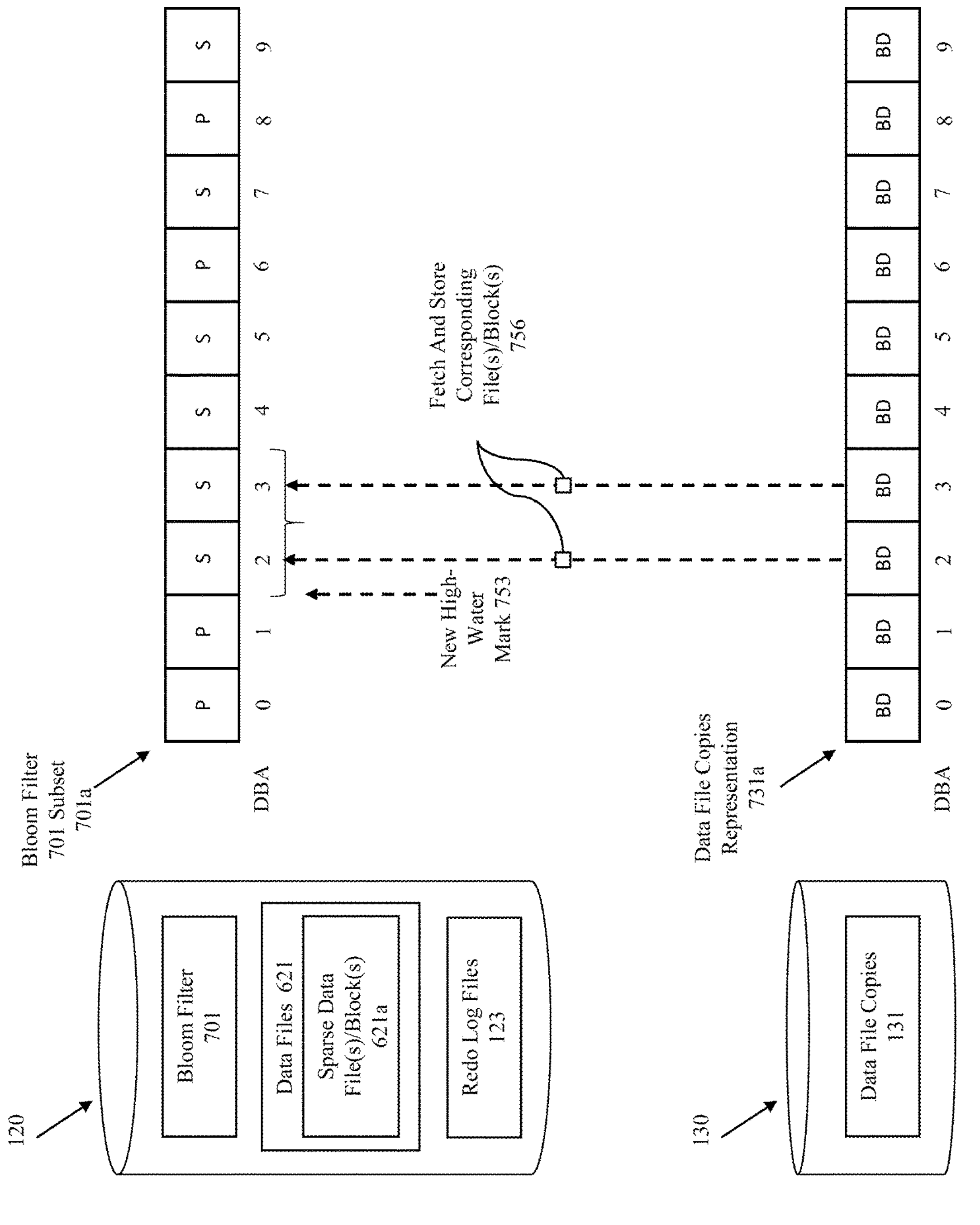
Figure 7G:
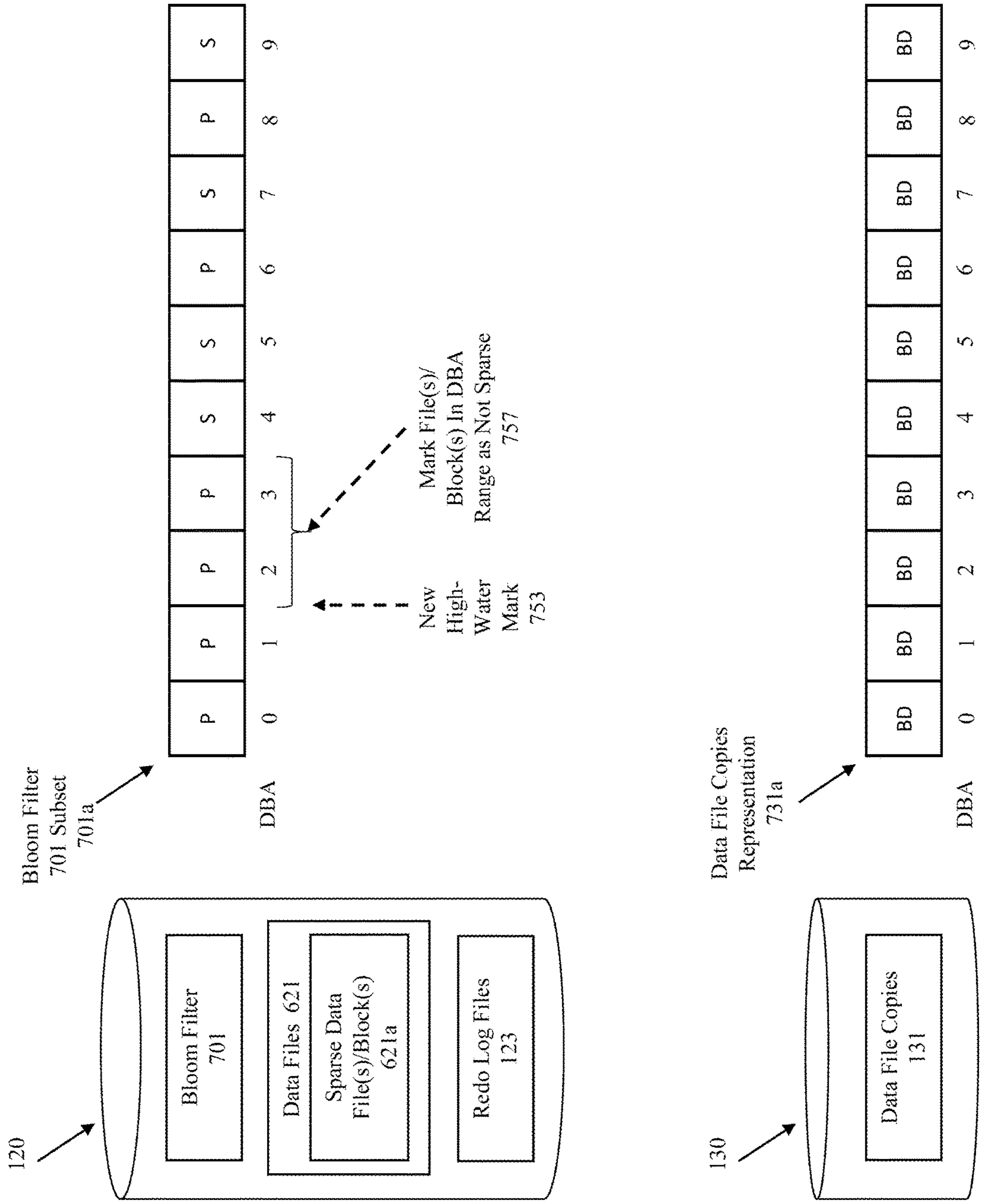

FIG. 7D illustrates a new high-water mark at 753 and analysis of the next range of DBA corresponding to blocks at 753. However, in contrast to the FIG. 7C example, here it is determined that the DBA range does include sparse data at 754. In response to the determination at 754, a lock on the DBA range is implemented at 755 of FIG. 7E. Once the lock has been applied the corresponding blocks are fetched from the data file copies 131 and stored in the corresponding locations in 621*a* as illustrated at 756 in FIG. 7F. Finally, the bloom filter is updated to indicate that the blocks in the DBA range are not sparse at 757 in FIG. 7G and the lock is released.

As previously indicated the approach illustrated herein could include a bloom filter that does not include a value for each block at respective DBAs but instead is associated with each sparse data file which might comprise a number of blocks or is associated with multiple blocks. In such a case additional processing may be necessary, such as to update metadata that indicates that any portion or the whole of the corresponding file is sparse to indicate that no portion is sparse.

System Architecture

Figure 8:
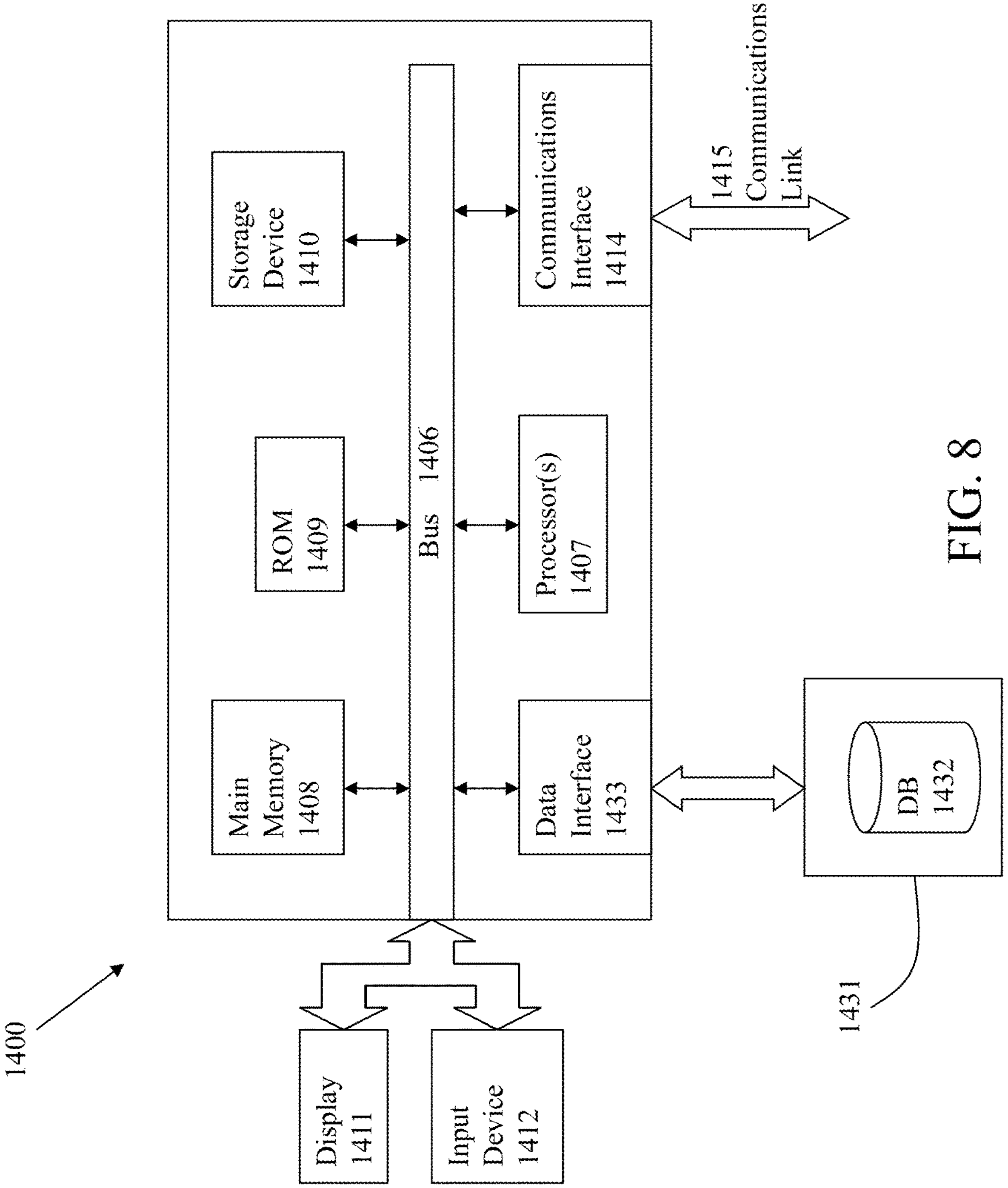
FIG. 8 is a diagram of a computing system suitable for implementing an embodiment of the present disclosure.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 9:
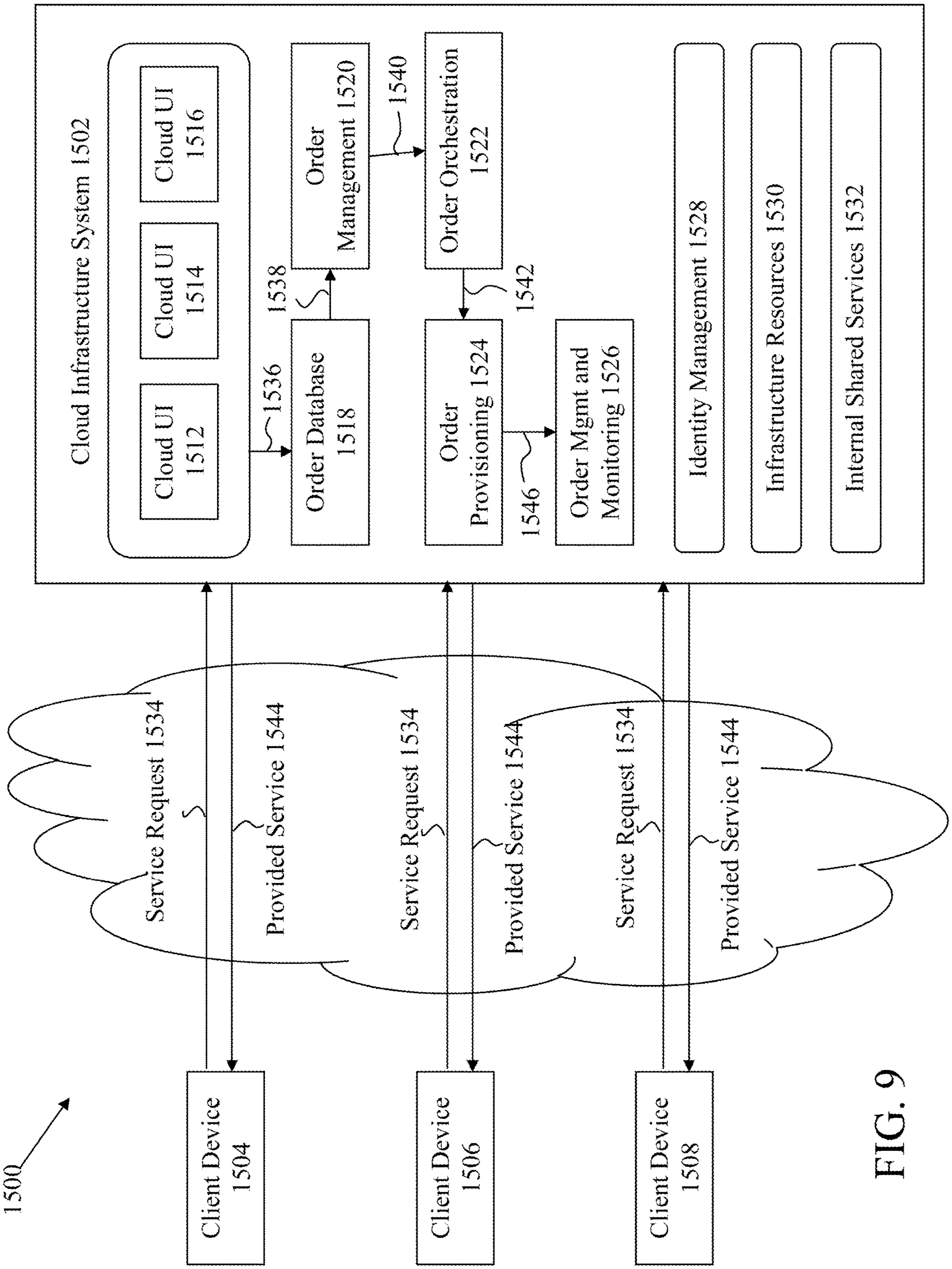
FIG. 9 is a block diagram of one or more components of a system environment in which services may be offered as cloud services, in accordance with an embodiment of the present invention.

FIG. 9 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the FIG. may have other components than those depicted. Further, the embodiment shown in the FIG. is only one example of a cloud infrastructure system that may incorporate an embodiment of the invention. In some other embodiments, cloud infrastructure system 1502 may have more or fewer components than shown in the FIG., may combine two or more components, or may have a different configuration or arrangement of components.

Client computing devices 1504, 1506, and 1508 may be devices similar to those described above for FIG. 8. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 1502, and the like.

In one embodiment, as depicted in the FIG., cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1518 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

Additionally, the approach disclosed herein for restoration and recovery of a database provides an improved approach over prior techniques. Specifically, the approach disclosed avoids the need to copy all data identified for copying/replacement before the database can be brought back up to service user requests. Specifically, the approach discloses the creation and population of one or more sparse data files and/or blocks, a redirection mechanism to service read operations where necessary, and a process to restore the data to one or more sparse data files and/or blocks over time, while the database maintains operability. Because this can be done far quicker than restoring a large dataset, the provided approach improves over prior approaches.

What is claimed:

1. A computer-implemented method comprising:

generating, for a database at a first location, a backup of the database at a second location different from the first location;

detecting a failure of the database; and restoring the database, using the backup of the database at the second location, to a restore location different from the second location at least by:

generating one or more sparse data files or blocks at the restore location, analyzing, at the restore location, redo records to identify corresponding data files or blocks to be fetched from the backup of the database at the second location, fetching, from the backup of the database at the second location and to the restore location, the corresponding data files or blocks identified by analyzing the redo records, and applying the redo records to the corresponding sparse data files or blocks at the restore location using the corresponding data files or blocks fetched from the backup of the database at the second location, wherein the database is accessible to user sessions using at least remaining sparse data files or blocks of the one or more sparse data files or blocks at the restore location.

2. The method of claim 1, wherein a result of applying the redo records to the corresponding data files or blocks is stored in the database at the restore location.

3. The method of claim 1, wherein the sparse data files or blocks reference a corresponding backup copy at the second location, and the database is accessible to user sessions during execution of restore operations using at least references in remaining sparse data files or blocks.

4. The method of claim 1, wherein respective redo records capture data to redo received instructions and applying a respective redo record to a corresponding data file or block comprises at least updating the data file or block using the respective redo record.

5. The method of claim 1, further comprising servicing a read or write request to the database having the one or more sparse data files or blocks at the restore location and wherein corresponding data is fetched from the backup at the second location in response to a determination that the read or write request is to at least one of the one or more sparse data files or blocks.

6. The method of claim 1, further comprising servicing a read or write request to the database having the one or more sparse data files or blocks at the restore location and wherein servicing the read or write request is executed before applying at least one redo record.

7. The method of claim 1, further comprising populating all the one or more sparse data files or blocks at the restore location.

8. The method of claim 7, wherein populating all the one or more sparse data files or blocks at the restore location comprises copying backup data at the second location to the restore location and replacing contents of at least some of the one or more sparse data files or blocks at the restore location with the data from the backup at the second location.

9. The method of claim 7, wherein populating all the one or more sparse data files or blocks at the restore location occurs at least partially after servicing a read or write request to the database having the one or more sparse data files or blocks at the restore location.

10. The method of claim 7, wherein populating all the one or more sparse data files or blocks is managed using a bloom filter or index structure, the bloom filter or index structure is processed to determine whether respective files or blocks are or might be sparse, and the bloom filter or index structure is modified to indicate that respective files or blocks are not sparse after populating the respective files or blocks.

11. A non-transitory computer readable medium having stored thereon a sequence of instructions which, when executed by a processor causes a set of acts comprising generating, for a database at a first location, a backup of the database at a second location different from the first location;

detecting a failure of the database; and restoring the database, using the backup of the database at the second location, to a restore location different from the second location at least by:

generating one or more sparse data files or blocks at the restore location, analyzing, at the restore location, redo records to identify corresponding data files or blocks to be fetched from the backup of the database at the second location, fetching, from the backup of the database at the second location and to the restore location, the corresponding data files or blocks identified by analyzing the redo records, and applying the redo records to the corresponding sparse data files or blocks at the restore location using the corresponding data files or blocks fetched from the backup of the database at the second location, wherein the database is accessible to user sessions using at least remaining sparse data files or blocks of the one or more sparse data files or blocks at the restore location.

12. The computer readable medium of claim 11, wherein a result of applying the redo records to the corresponding data files or blocks is stored in the database at the restore location.

13. The computer readable medium of claim 11, wherein the sparse data files or blocks reference a corresponding backup copy at the second location, and the database is accessible to user sessions during execution of restore operations using at least references in remaining sparse data files or blocks.

14. The computer readable medium of claim 11, wherein respective redo records capture data to redo received instructions and applying a respective redo record to a corresponding data file or block comprises at least updating the data file or block using the respective redo record.

15. The computer readable medium of claim 11, wherein the set of acts further comprise servicing a read or write request to the database having the one or more sparse data files or blocks at the restore location and corresponding data is fetched from the backup at the second location in response to a determination that the read or write request is to at least one of the one or more sparse data files or blocks.

16. The computer readable medium of claim 11, wherein the set of acts further comprise populating all the one or more sparse data files or blocks at the restore location.

17. The computer readable medium of claim 16, wherein populating all the one or more sparse data files or blocks at the restore location comprises copying backup data at the second location to the restore location and replacing contents of at least some of the one or more sparse data files or blocks at the restore location with the data from the backup at the second location.

18. The computer readable medium of claim 16, wherein populating all the one or more sparse data files or blocks at the restore location occurs at least partially after servicing a read or write request to the database having the one or more sparse data files or blocks at the restore location.

19. The computer readable medium of claim 16, wherein populating all the one or more sparse data files or blocks is managed using a bloom filter or index structure, the bloom filter or index structure is processed to determine whether respective files or blocks are or might be sparse, and the bloom filter or index structure is modified to indicate that respective files or blocks are not sparse after populating the respective files or blocks.

20. A computing system comprising:

a memory to hold a set of instructions;

a computer processor to execute the set of instructions, which when executed cause a set of acts comprising:

generating, for a database at a first location, a backup of the database at a second location different from the first location;

detecting a failure of the database; and restoring the database, using the backup of the database at the second location, to a restore location different from the second location at least by:

generating one or more sparse data files or blocks at the restore location, analyzing, at the restore location, redo records to identify corresponding data files or blocks to be fetched from the backup of the database at the second location, fetching, from the backup of the database at the second location and to the restore location, the corresponding data files or blocks identified by analyzing the redo records, and applying the redo records to the corresponding sparse data files or blocks at the restore location using the corresponding data files or blocks fetched from the backup of the database at the second location, wherein the database is accessible to user sessions using at least remaining sparse data files or blocks of the one or more sparse data files or blocks at the restore location.

* * * * *